US012659131B2

(12) United States Patent
Kaizer et al.

(10) Patent No.: US 12,659,131 B2
(45) Date of Patent: Jun. 16, 2026

(54) LIFECYCLE ADMINISTRATION OF DOMAIN NAME BLOCKCHAIN ADDRESSES

(71) Applicant: VERISIGN, INC., Reston, VA (US)

(72) Inventors: Andrew Kaizer, Arlington, VA (US); Swapneel Sheth, Fairfax, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

(21) Appl. No.: 18/646,690

(22) Filed: Apr. 25, 2024

(65) Prior Publication Data

US 2024/0372698 A1 Nov. 7, 2024

Related U.S. Application Data

(63) Continuation of application No. 17/325,726, filed on May 20, 2021, now Pat. No. 12,003,615.

(51) Int. Cl.
H04L 9/00 (2022.01)
H04L 9/08 (2006.01)
H04L 9/32 (2006.01)

(52) U.S. Cl.
CPC ............ H04L 9/008 (2013.01); H04L 9/3247 (2013.01)

(58) Field of Classification Search
CPC ..... H04L 9/008; H04L 9/3247; H04L 9/0891; H04L 9/50
See application file for complete search history.

(56) References Cited

U.S. PATENT DOCUMENTS

| | | |
|---|---|---|
| 10,721,060 B1 | 7/2020 | Kaizer et al. |
| 11,159,326 B1 | 10/2021 | Nelson et al. |

(Continued)

FOREIGN PATENT DOCUMENTS

| | | |
|---|---|---|
| CN | 107705114 A | 2/2018 |
| CN | 109981633 A | 7/2019 |

(Continued)

OTHER PUBLICATIONS

Kaizer, Andrew, et al.; The PCT Search Report and Written Opinion mailed Oct. 6, 2022 for PCT application No. PCT/US22/30248, 11 pages.; Application Number.

(Continued)

*Primary Examiner* — Vu V Tran

(74) *Attorney, Agent, or Firm* — Lee & Hayes, P.C.

(57) ABSTRACT

Systems, methods, and computer products for administering the association of a network identifier with a blockchain address for a blockchain enable operations that may include obtaining, by an authoritative record entity, an initiation of an administrative action regarding an association of the network identifier with the blockchain address, wherein the administrative action comprises at least one of deleting the association, updating the association, modifying the association, or renewing the association; and providing, in response to the obtaining, a registration entity proof message, wherein the registration entity proof message comprises a signature by a private key of the authoritative record entity, wherein the registration entity proof message specifies a registration entity of record for the network identifier. An executable program stored on the blockchain may be configured to obtain the signature, verify the signature, and implement the administrative action regarding the association of the network identifier with the blockchain address.

20 Claims, 12 Drawing Sheets

(56) References Cited

U.S. PATENT DOCUMENTS

| | | | |
|---|---|---|---|
| 11,354,658 | B2 | 6/2022 | Lyons et al. |
| 11,392,579 | B2 | 7/2022 | Kasimov et al. |
| 11,587,071 | B2 | 2/2023 | Ravinathan et al. |
| 11,621,829 | B2 | 4/2023 | Kaizer et al. |
| 11,632,236 | B1 | 4/2023 | Kaizer et al. |
| 2007/0130316 | A1 | 6/2007 | Turakhia |
| 2007/0143469 | A1 | 6/2007 | Adams et al. |
| 2008/0235383 | A1 | 9/2008 | Schneider |
| 2011/0296440 | A1 | 12/2011 | Laurich et al. |
| 2012/0011360 | A1 | 1/2012 | Engels et al. |
| 2012/0174198 | A1 | 7/2012 | Gould et al. |
| 2015/0278820 | A1 | 10/2015 | Meadows |
| 2016/0173439 | A1 | 6/2016 | Kaliski, Jr. et al. |
| 2016/0196300 | A1 | 7/2016 | Kamdar et al. |
| 2016/0292672 | A1 | 10/2016 | Fay et al. |
| 2017/0180134 | A1* | 6/2017 | King ................... H04L 63/0853 |
| 2017/0310484 | A1 | 10/2017 | Kaliski, Jr. et al. |
| 2017/0324738 | A1 | 11/2017 | Hari et al. |
| 2017/0330174 | A1 | 11/2017 | DeMarinis et al. |
| 2017/0344988 | A1 | 11/2017 | Cusden et al. |
| 2017/0346833 | A1 | 11/2017 | Zhang |
| 2018/0227275 | A1 | 8/2018 | Russinovich et al. |
| 2018/0262493 | A1 | 9/2018 | Andrade |
| 2018/0276663 | A1 | 9/2018 | Arora |
| 2018/0287997 | A1 | 10/2018 | Li et al. |
| 2019/0121988 | A1 | 4/2019 | van de Ruit et al. |
| 2019/0156040 | A1 | 5/2019 | Sasin et al. |
| 2019/0166085 | A1 | 5/2019 | Li et al. |
| 2019/0220831 | A1 | 7/2019 | Rangarajan et al. |
| 2019/0236571 | A1 | 8/2019 | Arora et al. |
| 2019/0253252 | A1 | 8/2019 | Qiu |
| 2019/0333054 | A1 | 10/2019 | Cona et al. |
| 2020/0021446 | A1 | 1/2020 | Roennow et al. |
| 2020/0034836 | A1* | 1/2020 | Shah ...................... G06Q 20/02 |
| 2020/0058023 | A1 | 2/2020 | Travizano et al. |
| 2020/0145373 | A1 | 5/2020 | Richardson |
| 2020/0314055 | A1 | 10/2020 | Blinn |
| 2020/0328883 | A1 | 10/2020 | Kaizer et al. |
| 2020/0382372 | A1 | 12/2020 | Easwar Prasad et al. |
| 2020/0403809 | A1 | 12/2020 | Chan et al. |
| 2020/0409942 | A1 | 12/2020 | Kasimov et al. |
| 2021/0037013 | A1 | 2/2021 | Salkintzis |
| 2021/0135867 | A1 | 5/2021 | Zeng et al. |
| 2022/0103370 | A1* | 3/2022 | Alwen .................... H04L 61/45 |
| 2022/0376889 | A1 | 11/2022 | Kaizer et al. |
| 2022/0376925 | A1 | 11/2022 | Kaizer et al. |
| 2023/0108514 | A1* | 4/2023 | Muhia ................... H04L 9/3073 |
| | | | 713/176 |

FOREIGN PATENT DOCUMENTS

| | | | |
|---|---|---|---|
| CN | 112671950 A | 4/2021 | |
| CN | 112765684 A | 5/2021 | |
| JP | 2021524978 | 9/2021 | |
| WO | WO2018007828 | 1/2018 | |
| WO | WO2020150741 | 7/2020 | |
| WO | WO2022246189 | 11/2022 | |
| WO | WO2022246193 | 11/2022 | |

OTHER PUBLICATIONS

Kaizer, Andrew, et al.; Office Action for U.S. Appl. No. 17/325,726 mailed on Feb. 13, 2023, Andrew Kaizer, "Lifecycle Administration of Domain Name Blockchain Addresses", 11 pages.; Application Number.

Ertola, 1D4me, General Overview, Version 1.3, Oct. 6, 2019, 5 pages.

Baritz et al., 1D4me—Technical White Paper DRAFT, Version 14, Feb. 28, 2020, 39 pages.

Bertola., 1D4me, Technical overview, Version 1.4, Oct. 4, 2019, 16 pages.

Office Action issued in U.S. Appl. No. 16/402,047 on Aug. 9, 2021, 10 pages.

Office Action issued in U.S. Appl. No. 16/402,047 on Feb. 1, 2021, 14 pages.

Office Action issued in U.S. Appl. No. 16/402,047 on May 11, 2021, 9 pages.

International Search Report and Written Opinion issued in International r \pplication No. PCT/US2019/038447 on Sep. 30, 2019, pp. 1-15.

Dan.com, "Domain Industry, Let us Innovate", https://blog.undeveloped.com/domain-industry-join-us-in-becoming-innovative-thriving-again-a751d2e17ae9, Nov. 21, 2017, pp. 1-6.

DNS Registrar guide—Ethereum Name Service, https://docs.ens.domains/dns-registrar-guide, Jan. 2020, pp. 1-5.

Domraider, "ICO Whitepaper," www.domraider.io, SIRET 79417114000013 [retrieved on Aug. 25, 2019]. Retrieved rom the Internet: URL:https://s3-eu-west-1.amazonaws.com/domraider/domraider/DomRaider+ICO+Whitepaper+EN.pdf, pp. 1-127.

Einarrson, B., "[DNSOP] Verifying TLD operator authorisation," https://mailarchive.ietf.org/arch/msg/dnsop/aDjnArp98TOgIBYQbUfswwaxrg, Jun. 18, 2019, 1 page.

Hollenbeck, "Extensible Provisioning Protocol (EPP) Domain Name Mapping," RFC 4931, https://datatracker.etf_org/doc/html/rfc4931, May 2007, pp. 1-46.

Hollenbeck, "Extensible Provisioning Protocol (EPP)," RFC 5730, https://datatracker.ietf.org/doc/html/rfc5730, Aug. 2009, pp. 1-67.

Hollenbeck, "Security Services for the Registration Data Access Protocal (RDAP)," RFC 7481, https://tools etf_org/html/rfc7481, Mar. 2015, pp. 1-13.

Johnson, "ENS Root Change Will Allow Easy Integration of More Than 1300 DNS TLDs, " https://medium.com/ he-ethereum-name-service/upcoming-changes-to-the-ens-root-a1b78fd52b38, Feb. 25, 2019, 4 pages.

Johnson, "How to claim your DNS domain on ENS," The Ethereum Name Service, Nov. 11, 2017, https://medium.com/the-ethereum-name-service/how-to-claim-your-dns-domain-on-ens-e600ef2d92ca, accessed Jun. 29, eorn, pp. 1-4.

Johnson, N., "[DNSOP] Verifying TLD operator authorisation," https://mailarchive.ietf.org/arch/msg/dnsop/?5D3cqSTWF69pAWqu5Pn6SGXDs, Jun. 14, 2019, 1 page.

Johnson., "Introducing.luxe on ENS," https://medium.com/@weka/introducing-luxe-on-ens-35a9ee2383ce, Oct. 2, 2018, 4 pages.

Kuhl, R., "[DNSOP] Verifying TLD operator authorisation," https://mailarchive.ietf.org/arch/msg/dnsop/bOEJRQzAafeGoMckNTt5GxSTe9g, Jun. 14, 2019, 1 page.

Millegan, "ENS +.KRED: Major Integration of DNS and ENS Launches," https://medium.com/the-ethereum- hame-service/ens-kred-major-integration-of-dns-and-ens-launches-e7efb4dd872a, Feb. 19, 2020, 3 pages.

Millegan, B., "Elhereum Name Service," Retrieved from the Internet on Sep. 7, 2021: https://vir.isi.edu/~venis/dinr2020/S/blanlly-ENS.pdf, 24 pages.

Millegan, B., "Linking DNS with blockchain-based ENS records," Retrieved from the Internet on Sep. 7, 2021: hllps://conso.icann.org/sites/default/liles/field-attached/presenlalion-dns-blockchain-ens-24jun 19-en.pdf, 31 pages.

Monster, R., "Domain Leasing : How we do it at Epik, and how you can too," https://www.epik.com/blog/leasing-omains-how-we-do-it-at-epik-and-how-you-can-too_html, Mar. 27, 2020, 14 pages.

Moosavi, "Rethinking Certificate Authorities: Understanding and Decentralizing Domain Validation," Concordia institute for Information Systems Engineering, Montreal, Quebec, Canada, Apr. 2, 2018, [retrieved on Aug. 25, 2019] Retrieved from the Internet: URL:https://pdfs.semanticscholar.org/7e38/b0c0e6f7066de9821b8fab6a489a 79907 44f.pdf pp. 1-92.

Office Action for U.S. Appl. No. 17/325,726, mailed on Sep. 7, 2023, Kaizer, "Lifecycle Administration of Domain Name Blockchain Addresses", 13 Pages.

PCT Search Report and Written Opinion mailed Oct. 6, 2022 for PCT application No. PCT/US22/30241, 8 pages.

Tarasov. "Internet Voting Using Zcash," University of Dublin, Trinity College, May 2017 [retrieved on Aug. 25, 2019]. Retrieved from the Internet: URL:https:J/scss.tod.ie/publications/theses/diss/20 17fTCD-SCSS-DISSERTATION-2017015.pdf pp. 1-89.

(56) References Cited

OTHER PUBLICATIONS

US Final Office Action for U.S. Appl. No. 16/515,825, dated Sep. 20, 2021, 19 pages.
US Non-Final Office Action for U.S. Appl. No. 16/515,825, dated Apr. 15, 2021, 14 pages.
Verisign, Inc., "Ethereum Name Service (ENS) Root Change Issues," Verisign Technical Note, https:/fwww.erisign_com/assets/labs/ens-root-change-issues, May 2020.pdf, pp. 1-2.
Search Report for European Application No. 22805571.1, Dated Mar. 28, 2025, 9 pages.

* cited by examiner

Obtain invocation of administrative action — 702

Provide registrar of record proof — 704

Blockchain actions — 706

856
Look up &
retrieve
associations

102
Registry

854
Send
command,
domain
name

858
Return
associations

104
Registrar

852
Send
request for
association
information

860
Return
associations

202
Registrant

800

DNS

BLOCKCHAIN

902
Proof
Provider

952
Obtain
instruction,
authorization

Determine
incentive
954

964
Implement
instruction

Pushing
Entity
602

110
Blockchain
Directory

962
Send
instruction

956
Obtain
compensation

960
Validate
signature,
store
incentive

906
Association
Requestor

958
Send
instruction,
authorization,
incentive

904
Signature
Verification
Program

900

LIFECYCLE ADMINISTRATION OF DOMAIN NAME BLOCKCHAIN ADDRESSES

RELATED APPLICATIONS

This application is a continuation of and claims priority to U.S. patent application Ser. No. 17/325,726, filed May 20, 2021, titled "LIFECYCLE ADMINISTRATION OF DOMAIN NAME BLOCKCHAIN ADDRESSES," the entirety of which is incorporated herein by reference.

FIELD

This disclosure relates generally to blockchain addresses, and, more particularly, associating domain names or other network identifiers with blockchain addresses.

BACKGROUND

A network identifier infrastructure system may assign network identifiers to network resources present at network addresses. Network identifiers may include alphanumeric strings. For example, network identifiers may include human-readable names. Examples of network identifiers include internet domain names, social media handles, telephone numbers, email addresses, and digital object architecture handles. Network identifiers may be organized in a hierarchy, with top level network identifiers at the top, and any number of network identifiers below them in the hierarchy. The network resources to which such network identifiers are assigned by the network identifier infrastructure system may be any of a variety of network resources, such as network-connected computers, social media accounts, telephone connections, email servers, or digital object architecture objects. For example, an assignment may associate a network identifier with a network address for a network resource. The network addresses may be in the form of numerical labels, for example, internet protocol (IP) addresses or blockchain addresses (described further below). Such numerical labels may be difficult for typical humans to remember. Thus, network infrastructure systems may, for example, assign human-friendly network identifiers to network resources present at network addresses that are inconvenient for humans to retain and utilize.

A particular type of network identifier infrastructure system is a domain name system (DNS). The term domain name system (DNS) may refer to, for example, a network identifier infrastructure system, such as a hierarchical distributed network identifier infrastructure system, for resources provided by computer servers that are connected to the internet. A DNS may associate a network identifier, such as domain name, to a network address, such as a numeric internet protocol (IP) address, of an internet resource. A DNS may thus allow computers to access networked resources, including web pages, using the assigned names.

In general, network infrastructure information (e.g., associations of network resources with network identifiers, public keys of asymmetric key pairs, signatures, etc.) may be stored in network infrastructure records. Further, network identifier infrastructure systems may include one or more authoritative record keepers or authoritative record entities. For example, a network identifier infrastructure system may include a network-accessible authoritative database that stores multiple network infrastructure records. Such an authoritative database may provide network infrastructure records to other, e.g., non-authoritative, network-accessible databases in the network. Some network identifier infrastructures are hierarchical, e.g., an authoritative record keeper or authoritative record entity may provide network infrastructure records to network-accessible databases that are under the authoritative record keeper or authoritative record entity in the hierarchy. Some such network identifier infrastructure systems may be structured such that an authoritative record keeper or authoritative record entity provides network infrastructure records to segments of the network, e.g., to portions of the network identifier namespace. For example, such a network identifier infrastructure system may provide to a respective database for that segment a network segment file, which may include network infrastructure records for resources that are present in that particular network segment.

An authoritative record keeper or authoritative record entity, such as in the context of a DNS, may be referred to as, for example, a registry. A registry may include an authoritative, master database of domain names registered under a top-level domain, or other domain in which domain names can be registered. A registry may include many hardware computer servers operably coupled to the internet. For ease of discussion, a registry may be identified with its computer servers and systems. Further, such as in the context of a DNS, network infrastructure records may be referred to as resource records, a network segment may be referred to as a zone, and a file of resource records for a particular zone may be referred to as a zone file.

Network identifier infrastructure systems may utilize registration facilitators or registration entities to register network identifiers to entities referred to as registrants. For example, a registration facilitator or registration entity may act as an intermediary between an authoritative record keeper or authoritative record entity and a person or end user entity that wishes to register a network identifier. The registration facilitator or registration entity may charge a fee to the registrant and convey registration information, e.g., the network identifier and a network address to which it is to be associated, to an authoritative record keeper or authoritative record entity. The authoritative record keeper or authoritative record entity may update its records accordingly. According to some networks, registrants are unable to directly interact with authoritative record keepers or authoritative record entity, and instead interact through registration facilitators or registration entities.

In the context of a DNS, a registration facilitator or registration entity may be referred to as a registrar. Registrars may facilitate registration of domain names to registrants in the DNS. Registrars may compete with one another to register domain names for registrants through the DNS registry. For example, an internet user may interact with a registrar to register a domain name, thereby becoming a registrant for the domain name. Registrars may include many hardware computer servers. For ease of discussion, a registrar may be identified with its hardware computer servers unless otherwise specified or clear from context. Further, for ease of discussion, a registrant may be identified with its hardware client computer unless otherwise specified or clear from context.

The term network identifier infrastructure operator may refer to an authoritative record keeper or a registration facilitator, for example. Similarly, the term DNS operator may refer to a registry or registrar, for example.

An electronic ledger that records transactions may be referred to as a blockchain. Such transactions may include, for example, but are not limited to, cryptocurrency transactions. In general, a blockchain may be implemented as a decentralized distributed readable and writeable computer interpretable data structure, stored in various computers (e.g., nodes) in a blockchain network (e.g., a cryptocurrency network). A blockchain may be constructed from individual logical blocks. Each block may include any, or a combination, of: a timestamp representing a time of the block's creation, a cryptographic hash of an identification of the previous block, and a payload, which includes data that may represent transactions or other information. The data in the blockchain payload may represent, for example, for each of one or more transactions, a transaction identifier, a transaction amount, and the address associated with the receiving party (e.g., associated with the receiving party's public key).

Blockchain users may have an associated blockchain address and/or cryptographic key pair, e.g., an asymmetric cryptographic key pair. Such a key pair may be referred to as the user's blockchain key pair that includes or consists of a public key (e.g., usable by the user to receive cryptocurrency) and a private key (e.g., usable by the user to send cryptocurrency). Each blockchain user may have a blockchain address that may serve as the user's identifier for purposes of the blockchain. For example, the blockchain address may be derived from the public key of the user's blockchain key pair, e.g., by applying a hash function. A first blockchain user may receive cryptocurrency from a second blockchain user, for example, who utilizes a blockchain address of the first blockchain user.

SUMMARY

Various embodiments include systems, methods, and computer products and media for administering the association of a network identifier with a blockchain address for a blockchain. In various implementations, the systems, methods, and computer products may perform, execute or enable operations, functions, and/or behaviors that include obtaining, by an authoritative record entity, an initiation of an administrative action regarding an association of the network identifier with the blockchain address, wherein the administrative action comprises at least one of deleting the association, updating the association, modifying the association, or renewing the association; and providing, in response to the obtaining, a registration entity proof message, wherein the registration entity proof message comprises a signature by a private key of the authoritative record entity, wherein the registration entity proof message specifies a registration entity of record for the network identifier. In such implementations, an executable program stored on the blockchain may be configured to obtain the signature, verify the signature, and implement the administrative action regarding the association of the network identifier with the blockchain address.

In some embodiments, the network identifier may include a domain name, the authoritative record entity may include a registry, and the registration entity may include a registrar. In some embodiments, In some embodiments, the operations, functions, and/or behaviors may also include providing the registration entity proof message to the blockchain. In some embodiments, the operations, functions, and/or behaviors may also include providing the registration entity proof message to the registration entity of record to send to the blockchain. In some further embodiments, the operations, functions, and/or behaviors may also include providing the registration entity proof message to the registration entity of record to send to a registrant of the network identifier to include with a signed request message for sending to the blockchain.

In various embodiments, obtaining the initiation may further include receiving a message from the registration entity of record for the network identifier specifying the administrative action. In some other embodiments, obtaining the initiation may further include obtaining an indication of an expiration of a registration of the network identifier.

In some embodiments, the administrative action may include associating the network identifier with the blockchain address. In some other embodiments, the administrative action may include modifying the association of the network identifier with the blockchain address. In yet other embodiments, the administrative action may include removing the association of the network identifier with the blockchain address. In yet other embodiments, the administrative action may include updating an expiration of the association of the network identifier with the blockchain address.

According to various embodiments, a method of providing an incentive to update an associations of a network identifier with a blockchain address is presented. The method includes: obtaining, over an electronic network, the association of the network identifier with the blockchain address, and an authorization to push the association of the network identifier with the blockchain address to a blockchain; determining an incentive to update the association of the network identifier with the blockchain address at the blockchain, where the incentive includes a quantity of cryptocurrency; and sending, over the electronic network and to the blockchain, the association of the network identifier with the blockchain address, the authorization to push the association of the network identifier with the blockchain address to the blockchain, and the incentive, for the blockchain to verify the authorization to push the association of the network identifier with the blockchain address to the blockchain, store the association of the network identifier with the blockchain address, and store the incentive for future payment to an entity that updates the association of the network identifier with the blockchain address.

Various optional features of the above embodiments include the following. The authorization to push the association of the network identifier with the blockchain address to the blockchain may include a signature formed using a private key of a cryptographic key pair. The authorization to push the association of the network identifier with the blockchain address to the blockchain may include an identification of a registration facilitator of record for the network identifier, and the private key may include a private key of an authoritative record keeper for the network identifier. The network identifier may include a domain name, where the registration facilitator includes a registrar of record for the domain name, and where the authoritative record keeper includes a registry for the domain name. The authorization to push the association of the network identifier with the blockchain address to the blockchain may include at least a portion of registration status information for the network identifier, and the private key may include a private key of an authoritative record keeper for the network identifier. The network identifier may include a domain name, and the authorization to push the association of the network identifier with the blockchain address to the blockchain may include at least a portion of a record for the domain name provided according to one of: an extension of Registration Data Access Protocol (RDAP), an extension of WHOIS, or an extension of a Repository-based Data Dissemination (ROD) protocol. The incentive may include a quantity of cryptocurrency sufficient to record a transaction on the blockchain. The incentive may further include a quantity of cryptocurrency for compensating the entity that updates the association of the network identifier with the blockchain address. The quantity of cryptocurrency may be stabilized from cryptocurrency value fluctuations. The method may further include receiving, from a holder of the network identifier, compensation including at least a value of the incentive. The method may further include notifying a holder of the network identifier of an opportunity to update the association of the network identifier with the blockchain address.

According to various embodiments, a system for providing an incentive to update an associations of a network identifier with a blockchain address is provided. The system includes at least one electronic processor configured to perform operations including: obtaining, over an electronic network, the association of the network identifier with the blockchain address, and an authorization to push the association of the network identifier with the blockchain address to a blockchain; determining an incentive to update the association of the network identifier with the blockchain address at the blockchain, where the incentive includes a quantity of cryptocurrency; and sending, over the electronic network and to the blockchain, the association of the network identifier with the blockchain address, the authorization to push the association of the network identifier with the blockchain address to the blockchain, and the incentive, for the blockchain to verify the authorization to push the association of the network identifier with the blockchain address to the blockchain, store the association of the network identifier with the blockchain address, and store the incentive for future payment to an entity that updates the association of the network identifier with the blockchain address.

Various optional features of the above embodiments include the following. The authorization to push the association of the network identifier with the blockchain address to the blockchain may include a signature formed using a private key of a cryptographic key pair. The authorization to push the association of the network identifier with the blockchain address to the blockchain may include an identification of a registration facilitator of record for the network identifier, and the private key may include a private key of an authoritative record keeper for the network identifier. The network identifier may include a domain name, where the registration facilitator includes a registrar of record for the domain name, and where the authoritative record keeper includes a registry for the domain name. The authorization to push the association of the network identifier with the blockchain address to the blockchain may include at least a portion of registration status information for the network identifier, and the private key may include a private key of an authoritative record keeper for the network identifier. The network identifier may include a domain name, and the authorization to push the association of the network identifier with the blockchain address to the blockchain may include at least a portion of a record for the domain name provided according to one of: an extension of Registration Data Access Protocol (RDAP), an extension of WHOIS, or an extension of a Repository-based Data Dissemination (ROD) protocol. The incentive may include a quantity of cryptocurrency sufficient to record a transaction on the blockchain. The incentive may further include a quantity of cryptocurrency for compensating the entity that updates the association of the network identifier with the blockchain address. The quantity of cryptocurrency may be stabilized from cryptocurrency value fluctuations. The operations may further include receiving, from a holder of the network identifier, compensation including at least a value of the incentive. The operations may further include notifying a holder of the network identifier of an opportunity to update the association of the network identifier with the blockchain address.

In various system implementations, the system may include: a memory containing instructions; and a processor, operably connected to the memory, that executes the instructions to perform, execute, or enable the operations, functions, and/or behaviors described herein.

It is intended that combinations of the above-described elements and those within the specification may be made, except where otherwise contradictory.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
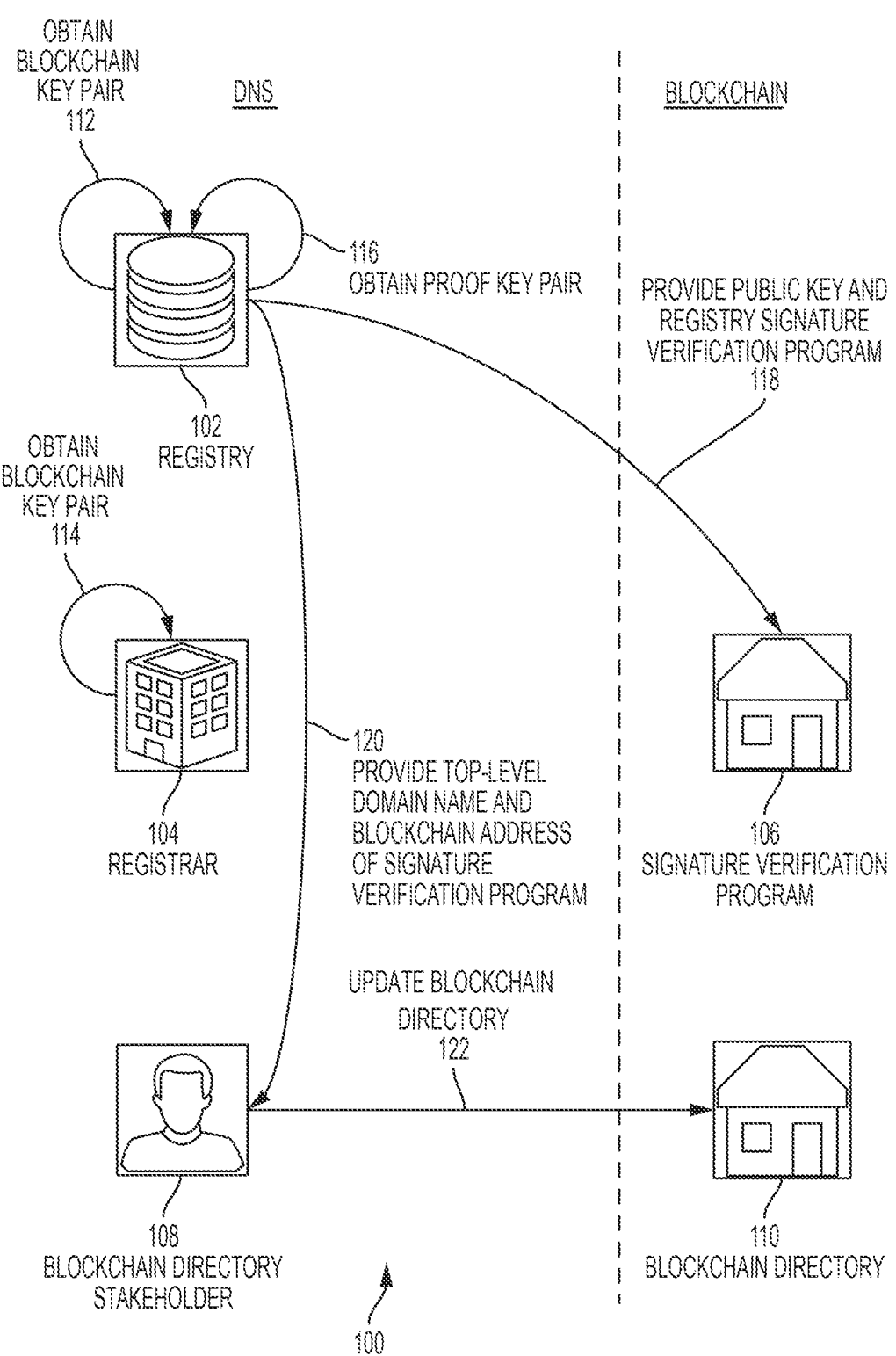
FIG. 1 is a hybrid diagram of a setup method to prepare for associating a DNS domain name registered to a registrant with a blockchain address according to various embodiments.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

I. Introduction

Some embodiments provide the ability to use and administer domain names registered in the traditional Domain Name System (DNS) environment (e.g., at a registrar) in a blockchain environment. For example, if a registrant controls a network identifier, such as a registration of a domain name example.com, the registrant may wish to be able to use the network identifier instead of a blockchain address. This enables a human friendly way to interact with other blockchain users by using a domain names as blockchain addresses instead of a numeric or alphanumeric (e.g., hexadecimal) blockchain address. For example, from the user's perspective in interacting with a blockchain through software, a domain name may be used instead of the blockchain address to which it is associated. For example, a first user may send cryptocurrency to a second blockchain user by specifying a cryptocurrency amount and the second user's domain name to a blockchain interface, e.g., a wallet (described further below). Thus, the association permits blockchain users to utilize their unique identifier or web presence, e.g., example.com, instead of their blockchain address or blockchain presence.

An association of a network identifier such as a domain name with a blockchain address may be implemented at least in part by storing a representation of the association, e.g., in a location accessible by the blockchain, such as in the blockchain itself. The association may be stored in a table, for example, where one column in the table stores a representation of the network identifier (e.g., the network identifier itself) and another column stores the associated blockchain address. Additional columns may store additional information according to various embodiments. The arrangement of the columns may appear in any order. Alternately, or in addition, the association may be stored in the form of a tuple, e.g., <network identifier, blockchain address>. Such a form of association storage is not limited to doubles; additional elements may be included to such tuples according to various embodiments, e.g., <network identifier, blockchain address, first other data, second other data, . . . >. The elements of such tuples may appear in any order. From the perspective of a blockchain user, the stored association may not be visible, but such a user may use its network identifier instead of its blockchain address, e.g., in interacting with blockchain software.

Moreover, some embodiments provide for administering the associations of domain names with blockchain addresses. As described in detail herein, some embodiments provide for the ability to create, update, delete, transfer, renew, and obtain information regarding associations of domain names with blockchain addresses. Some embodiments provide corresponding commands that may be executed by the registry, including Create, Update, Delete, Transfer, Renew, and Info. According to some embodiments, these commands are implemented as extensions of existing Extensible Provisioning Protocol (EPP) commands for operations such as, but not limited to, Create, Update, Delete, Transfer, Renew, and Info. According to some embodiments, the extended EPP commands may accomplish EPP operations in the DNS environment, e.g., making changes to records stored by at least the registry, and operations in the blockchain environment, as set forth in detail herein.

Some embodiments may provide incentives in the form of cryptocurrency to remove stale (e.g., expired) associations of blockchain addresses with domain names. For example, if DNS registration of a domain name expires, some embodiments provide incentives to an entity or any entity to remove an association of a blockchain address with the expired domain name.

Some embodiments leverage information known by each party—registry, registrar, and registrant—to prove domain name registration, which may then be utilized by a registrant to securely claim and, from their perspective, use a domain name instead of their blockchain address. At a high level, some embodiments may include two phases. First, a setup phase creates and/or provisions components in the DNS and blockchain environments. Second, an execution phase occurs where actions are performed to administer associations between domain names and blockchain addresses.

Embodiments include many innovations, benefits, and technical advantages. For example, some embodiments insert an executable program, such as a signature verification program, described in detail herein, into the blockchain. The signature verification program may be provided and maintained by a registry for the associated top-level domain.

As another example, some embodiments provide a way for the signature verification program to verify the claim of domain name registration via a cryptographic verification system, such as an asymmetric cryptographic system. This verification may ensure that domain names can only be added to the blockchain with the registry's authorization as represented by the registry's signature. This verification is advantageous, e.g., to ensure that the data is coming from an authoritative source, because many blockchains do not allow for an external network connection to be established to fetch or retrieve information.

As yet another example, some embodiments establish and utilize a registry function, such as, for example, a registrar of record proof. A registrar of record proof may be implemented as an Extensible Provisioning Protocol (EPP) extension, as an API command, or may utilize an existing domain object extension and associated commands. For purposes of illustration rather than limitation, an EPP extension version of the registrar of record proof function is described; other implementations may have the same or similar functionality regardless of implementation. According to some embodiments, this EPP extension may be implemented using an extension of an Info command, such as an EPP Info command. Such an extended Info command may provide several types of information regarding the association of a domain name with a blockchain address. One type of information is a certified proof of such an association. For a certified proof of an association of a domain name with a blockchain address, the Info command may accept as arguments a domain name and an identification of a blockchain. A registry receiving an Info command may compare the registrar of record for the domain name, such as the registrar that is recorded in the registry database for the domain name, with the registrar that is making the particular Info command. If the registrar of record for the domain name is the same as the registrar that is making the particular Info command, the registry may sign a message containing the domain name and blockchain address for the identified blockchain and pass the signed message back to the requesting registrar. Otherwise, the registry may return an error. This process is configured to prove that the registry has confirmed that a particular registrar's request to associate the domain name with the blockchain address in the blockchain environment is valid. According to some embodiments, any entity can submit a request for a registrar of record proof to the registry using the extended EPP Info command, and no check as to the identity of the requestor is performed. According to such embodiments, the Info command may accept as arguments a domain name and an identification of a blockchain and returns a signed message containing the domain name and blockchain address for the blockchain. According to some embodiments, the Info command may accept a domain name as an argument, and return a signed message containing the domain name and multiple (e.g., all that are recorded) blockchain addresses for any blockchain, as well as identifications of the respective blockchain(s). Further functions of the extended Info command are provided below.

According to an embodiment, use of DNS Security (DNSSEC) is not required. According to an embodiment, delegating a domain name into a zone is not required.

These and other features and advantages are described in detail herein.

II. Setup Phase

FIG. 1 is a hybrid diagram of a setup method 100 to prepare for associating a DNS domain name registered to a registrant with a blockchain address according to various embodiments. Setup method 100 may be performed to establish and configure the hardware, software, and protocol components used to perform the methods shown and described herein. The left-hand side of the diagram depicts the DNS environment, and the right-hand side depicts the blockchain environment.

Setup method 100 may begin with registry 102 obtaining 112 a blockchain key pair and registrar 104 obtaining 114 a blockchain key pair. In general, a blockchain key pair may include a public key and a private key of an asymmetric cryptographic scheme, known to one of ordinary skill in the art. These blockchain key pairs are the registry's 102 and the registrar's 104 blockchain keys, which they may use to perform blockchain transactions. According to an embodiment, registry 102 and registrar 104 may obtain respective blockchain addresses instead of respective blockchain user public keys; for example, either blockchain addresses or public keys may be used as network identifiers for users in the blockchain environment. For example, registry 102 and registrar 104 may obtain their respective blockchain key pairs (or respective private keys and addresses) by generating them themselves, or by acquiring them from a different entity, such as a certificate authority.

According to some embodiments, registry 102 and registrar 104 obtain their respective key pairs (or respective private keys and addresses) through the use of, or by acquiring, respective electronic wallets. For example, an electronic wallet may be a computer executable software program or application that facilitates interactions with a blockchain. The wallet may execute on a user device such as a personal computer or a smart phone. The wallet may be used with a blockchain to facilitate the sending and receiving of cryptocurrency. According to an embodiment, a wallet may have built in user-callable functionality to generate blockchain key pairs (or private keys and addresses) and send and receive cryptocurrency. According to an embodiment, the wallet, as contemplated herein, may have additional functionality as described further herein.

After registry 102 and registrar 104 have obtained their respective key pairs, according to setup method 100, registry 102 may add support for providing a registrar of record proof. For example, the registrar of record proof may be used to prove that a given registrar is the registrar of record for a particular specified domain. By way of non-limiting example, the registrar of record proof may be used to prove that the particular registrar that requests the registrar of record proof is the same registrar the registrant used to register their domain name. By way of non-limiting example, any entity may request and receive a registrar of record proof. The registrar of record proof may be implemented as an EPP extension, and registry 102 may utilize EPP and extensible Markup Language (XML) to configure its existing EPP interface to handle registrar of record proof requests—using either a new or existing domain object extension and associated commands, e.g., an extension of Info.

Further, registry 102 may obtain 116 (e.g., generate) a proof key pair, such as an asymmetric cryptographic key pair, of which the private key may be used to sign, cryptographically, a registrar of record proof. Cryptographic signatures are known to those of ordinary skill in the art. The public key of the proof key pair may be used by a registrar to verify that proof corresponding to their registrar of record proof requests came from the same registry 102 to which they sent the request and have not been altered, e.g., by a man-in-the-middle attack.

In use, after registry 102 establishes registrar of record proof support (e.g., using Info of EPP), a registrar (e.g., registrar 104) may request a proof produced by such a registrar of record proof support from registry 102. For example, the registrar's request for the proof may be formatted using XML according to EPP protocol. According to an embodiment, the registrar's request for the proof may include a domain name and possibly additional information such as a blockchain address as described further below. The request may include information identifying the registrar that makes the request, such as the Internet Protocol (IP) address of the registrar. To respond to the request, registry 102 may first check whether the registrar that sent the request is the same registrar of record for the domain name identified in the request according to its records. If not, then registry 102 may return an error message. If so, then registry 102 may return a registrar of record proof, such as, for example, a message containing the domain name and other information provided by the requester (e.g., a blockchain address) that registry 102 has signed using the private key from its previously obtained proof key pair.

According to some embodiments, an expiration may be included with the registrar of record proof. For example, registry 102 may include the expiration with the registrar of record proof. According to an embodiment, the expiration may be at least one of a time and date after which the proof is not considered valid, an issuing time and date, and/or a sequence number. For the issuing time and date (or sequence number), a receiver of the registrar of record proof may compare them to the present time and date (or sequence number) to determine whether the difference has exceeded a specified time limit. Expiration information may be included in a signed portion of the proof. The expiration information may ensure a replay attack is prevented, e.g., to prevent a (former) registrant from associating the domain name with a blockchain address in the future after registration of the domain name has been transferred to a different registrant.

The time limit for the expiration may be on the order of one, two, three, or more days, or coextensive with the expiration of the domain name's registration, for example. Registry 102 may store the time limit or a representation of the time limit in the registry records.

Further, according to setup method 100, registry 102 may provide 118 a computer executable signature verification program 106 to the blockchain for inclusion in a block in the blockchain. Signature verification program 106 may be in the form of a blockchain smart contract according to some embodiments. Registry 102 may include a copy of the public key of its proof key pair in the signature verification program. In operation, signature verification program 106 may perform a signature verification algorithm defined by its computer executable code. The signature verification algorithm may accept as input data that includes at least an electronic signature, determine whether the signature is valid using the public key, and output a response indicating whether or not the signature is valid.

1. Input: data, signature on the data, and public key;
2. Apply public key to signature;
3. Check whether signature is valid (by way of non-limiting example, determine whether hash of data matches the public key as applied to the signature);
4. Output: results of determination at step 3.

Example Signature Verification Algorithm

The signature verification program 106 on the blockchain may serve as an entry point to associate a domain name with a blockchain address in the blockchain environment, where the association is already recorded in the DNS environment. After a node in the blockchain adds signature verification program 106 to a block in the blockchain, such as per the request of registry 102, registry 102 may receive back an address of the blockchain indicating where the signature verification program 106 is stored in the blockchain. This address serves as a blockchain address for the signature verification program 106.

Next, according to setup method 100, a step may account for a blockchain that has an existing name service. Some blockchains permit blockchain users to use a name having a particular specified format (but not an arbitrary domain name with any type of format) to be associated with their blockchain address. Such an association may be held in a blockchain directory, such as blockchain directory 110. Blockchain directory 110, for example, may keep track of which blockchain addresses are associated with which names in the blockchain. According to some embodiments, blockchain directory 110 is embodied by, or utilizes, a non-transitory computer executable blockchain name services program stored in a block of the blockchain. According to such embodiments, the blockchain name services program is a smart contract. In operation, the blockchain name services program may accept as input a command to associate a name with a specified blockchain address, along with a specified name, and may store a record of such association upon processing such command. Alternately, or in addition, blockchain directory 110 may include or utilize a table of associations between names and blockchain addresses.

For embodiments in which the blockchain does not include an existing name services framework, such a framework may be added to handle domain names associated with blockchain addresses per some embodiments. The added framework may include a blockchain name services program as described herein and/or a blockchain directory such as blockchain directory 110.

Thus, according to some embodiments, to account for blockchains that have existing name services, registry 102 may provide the top-level domain names(s) for which is it the registry of (e.g., the top-level domain names dot com, dot net, dot edu, etc.), along with the blockchain address of the signature verification program 106, to the blockchain directory stakeholder 108 (e.g., owner or manager). Blockchain directory stakeholder 108 may then update 122 blockchain directory 110 with the provided information, for example, with information indicating that the top-level domain names are controlled, in the blockchain sense, by the signature verification program. Blockchain directory stakeholder 108 may perform such an update 122 by passing the top-level domain name(s) over which it has registration authority and the blockchain address of the signature verification program 106 to the name services program, which updates a record of the association.

According to some embodiments, to account for blockchains that have existing name services, instead of the providing 120 and the updating 122 described above, registry 102 may submit to the blockchain for inclusion in the blockchain a message that includes the top-level domain name(s) (e.g., dot com, dot net, dot edu, etc.) for which registration is handled by registry 102 and the blockchain address of the signature verification program 106, signed by the private key of the blockchain key pair of registry 102. The message may be submitted to the blockchain for inclusion in a block to indicate that registry 102 has conveyed control of the top-level domain name to the registry proof verification program at the provided blockchain address for purposes of associating domain names under the top-level domain name with blockchain addresses in the blockchain.

Finally, according to setup method 100, registrar 104 (or a trusted service provider) may add functionality to its website or service to enable domain name registrants to sign in and request a domain name be associated with their blockchain address. This may include adding, or reconfiguring an existing, user interface and adding functionality for fetching proofs from registry 102, and may also include functionality for registrar 104 to submit the proof to the blockchain.

According to an embodiment, the service provider may be trusted by some or all interested parties. In general, a trusted entity may be identified on a predetermined list, e.g., a whitelist, and an untrusted entity may be identified in a predetermined list, e.g., a blacklist. For example, the user may act through the registrar or registry, which may make a change to the blockchain. As another example, the user may act through a trusted service provider, e.g., a third party trusted service provider, which may make changes to the blockchain directly, through a registry, through a registrar, or through a registrar, which takes actions through the associated registry. In sum, service providers as contemplated herein may be trusted to interact with many different entities on behalf of a registrant.

III. Create Execution Phase-Establishing an Association

Figure 2:
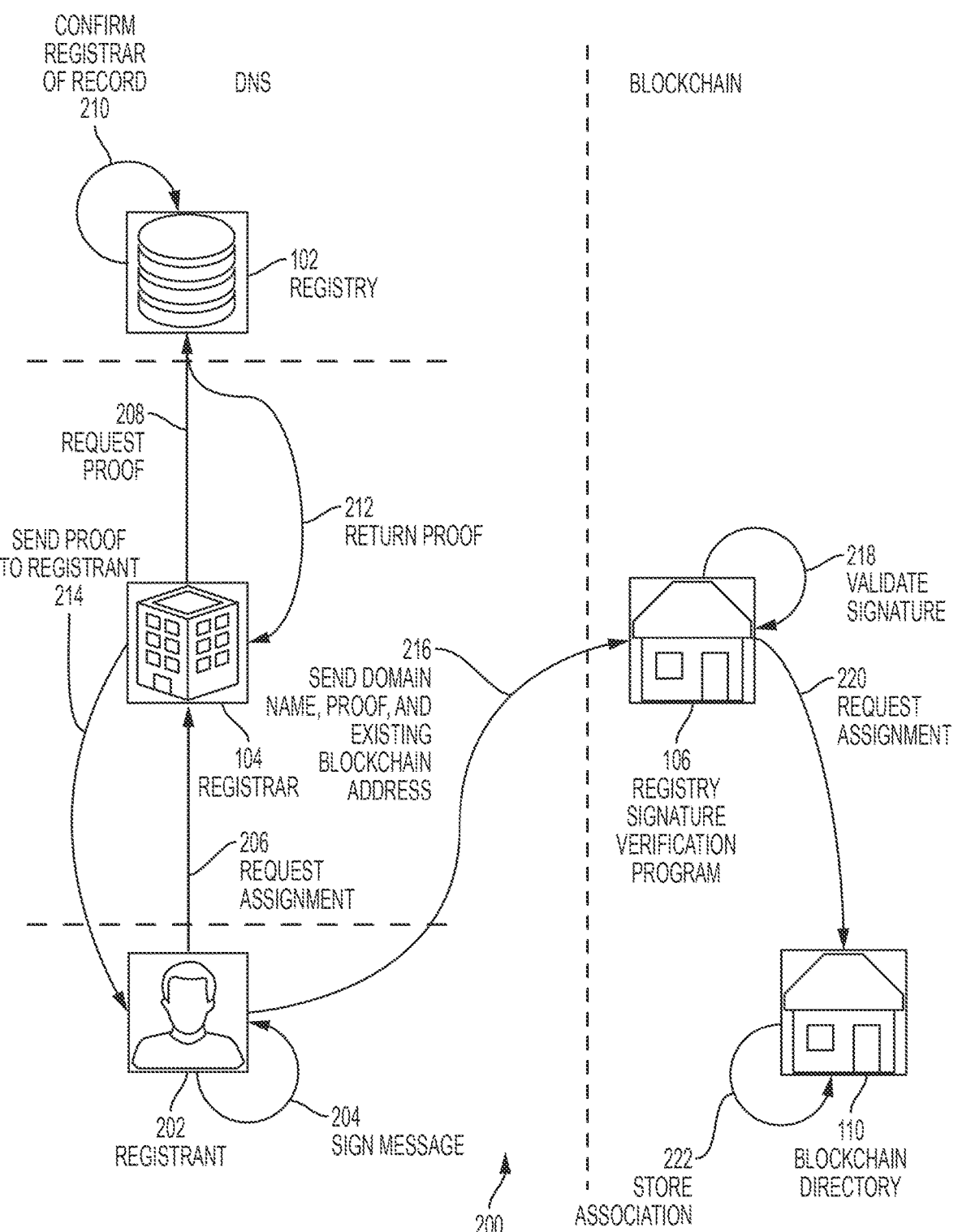
FIG. 2 is a hybrid diagram of a registrant facilitated method for associating a DNS domain name registered to a registrant with a blockchain address according to various embodiments.

FIG. 2 is a hybrid diagram of a registrant facilitated method 200 for associating a DNS domain name registered to registrant 202 with a blockchain address according to various embodiments. For convenience, method 200 is described in reference to the same registry 102, registrar 104, signature verification program 106, and blockchain directory 110 as described above in reference to FIG. 1. Method 200 may be initiated by a registrant, such as registrant 202. The actions performed by registrant 202 in method 200 may be performed through or by the registrant's wallet according to some embodiments.

According to an embodiment, method 200 may include a process for registrant 202 to sign 204 its existing blockchain address using its blockchain private key to create a proof of blockchain address control or ownership. Control or ownership may include using the blockchain address to access the blockchain. This process may be accomplished any time prior to registrant 202 requesting 206 association of a domain name with its blockchain address at registry 102. The proof of blockchain address ownership may be passed to registrar 104 to be validated, after registrar 104 receives a message from registrant 202 specifying a domain name and blockchain address and requesting association of the specified domain with as the user's specified existing blockchain address. To validate the proof of blockchain address ownership at that point, registry 102 may verify the signature using the public key of the user's blockchain key pair and check whether the specified blockchain address in the message matches the blockchain address that is signed in the proof.

The message from registrant 202 to registrar 104 specifying a domain name and blockchain address and requesting associating the specified domain name with the user's specified existing blockchain address may be sent to registrar 104 using any communication channel, e.g., an interface provided by registrar 104 or an API. Once registrar 104 receives the message, registrar 104 forms and sends a corresponding command to registry 102. The corresponding command to registry 102 may be in the form of an extended EPP Create command according to some embodiments. Such an extended EPP Create command may accept as parameters a domain name and a blockchain address, and possibly also a blockchain identification. According to some embodiments, the extended EPP Create command may also accept a proof of blockchain address ownership, as described above. Registry 102 may receive the extended EPP Create command, and for embodiments that include a proof of blockchain address ownership, may validate the proof. If successfully validated, registry 102 may proceed to store the association of the domain name with the blockchain address in the registry records. According to some embodiments, registry 102 may return a registrar of record proof in response to a successful execution of the extended EPP Create command. After the association is stored by registry 102, registrant 202, or any other entity, may initiate method 200 for associating the domain name with the blockchain address in the blockchain environment.

The domain name association method 200 may be initiated by registrant 202 by requesting 206 association of a specified domain name that is registered to registrant 202. According to an embodiment, the domain name association method 200 may be initiated by registrant 202 by requesting 206 association of a specified domain name that is registered to registrant 202 with a blockchain address. Registrant 202 may send a request message with this data to registrar 104. The message may also include the proof of blockchain address ownership and/or an identification of the particular blockchain, e.g., in embodiments that provide method 200 for multiple blockchains. According to some embodiments, registrant 202 initiates the process through a webpage interface provided by registrar 104.

Next, per method 200, registrar 104 requests 208 a registrar of record proof from registry 102. The request may include, for example, the domain name and blockchain address specified by registrant 202. The request may be in the form of an extended EPP Info command, as described above in Section II.

Next, per method 200, registry 102 confirms 210 that the registrar that sent the request is the registrar of record for the provided domain name, e.g., using the originating IP address of the request, to identify the requesting registrar. Registry 102 may check the IP address (or other identifier) against its stored registrar records. If a registrar of record match is found, then method 200 proceeds to the next step in the process; otherwise, the process may halt at this stage, possibly after registry 102 returns an error message to registrar 104, which returns a like error message to registrant 202.

Next, per method 200, registry 102 returns 212 a registrar of record proof signed with the private key of the proof key pair obtained 112 during the setup phase shown and described above in reference to FIG. 1. The proof may include <domain name> in the proof's body along with a signature on <domain name>. According to some embodiments, the proof may include, by way of non-limiting example, the pair <domain name, address> in the proof's body along with a signature on <domain name, address>. Additional information may appear in the pair to form an n-tuple, where n can be any number greater than two, and the information may appear in any order. The proof is used later by signature verification program 106 to verify that the <domain name, address> combination is valid and that association of the domain name with the blockchain address is permitted.

Next, per method 200, registrar 104 sends 214 the proof to registrant 202 per registrant facilitated embodiments as presented herein.

Per method 200, registrant 202 receives the proof and forms a message containing the proof, the domain name, and the address. Registrant 202 may send 216 the message to signature verification program 106. This may be accomplished by the registrant's wallet without requiring further involvement by the user or human registrant.

Next, per method 200, signature verification program 106 may validate 218 the registry's signature on the proof received from registrant 202 using the public key of the proof key pair provisioned during the setup phase. If not valid, then the process may halt, possibly with an error message conveyed from signature verification program 106 back to registrant 202 and/or registrar 104. Otherwise, method 200 proceeds as follows.

Next, per method 200, signature verification program 200 may request 220 associating the domain name with the registrant's blockchain address by sending a message to blockchain directory 110. In embodiments where blockchain directory 110 includes an executable program such as a smart contract, the message may be in the form of a command to associate the domain name with the registrant's blockchain address. According to such embodiments, the command may specify the domain name and the existing blockchain address of registrant 202.

Next, per method 200, blockchain directory 110 may store 222 an association between the domain name and the existing blockchain address. Such an association may be stored in a table, for example. Any existing association of the domain name to a blockchain address may be overwritten.

According to registrant facilitated method 200, registrant 202 may push at least one or more of the proof, domain name, and existing blockchain address to signature verification program 106. According to embodiments, these data may be pushed to signature verification program 106 by registry 102 or registrar 104. In general, the pushing can be done by any entity, such as a trusted service provider, that may have access to the data. Signature verification program 106 does not require that the message come from any particular source. Thus, according to embodiments, FIG. 3 depicts a registrar facilitated method 300, and FIG. 4 depicts a registry facilitated method 400.

Figure 3:
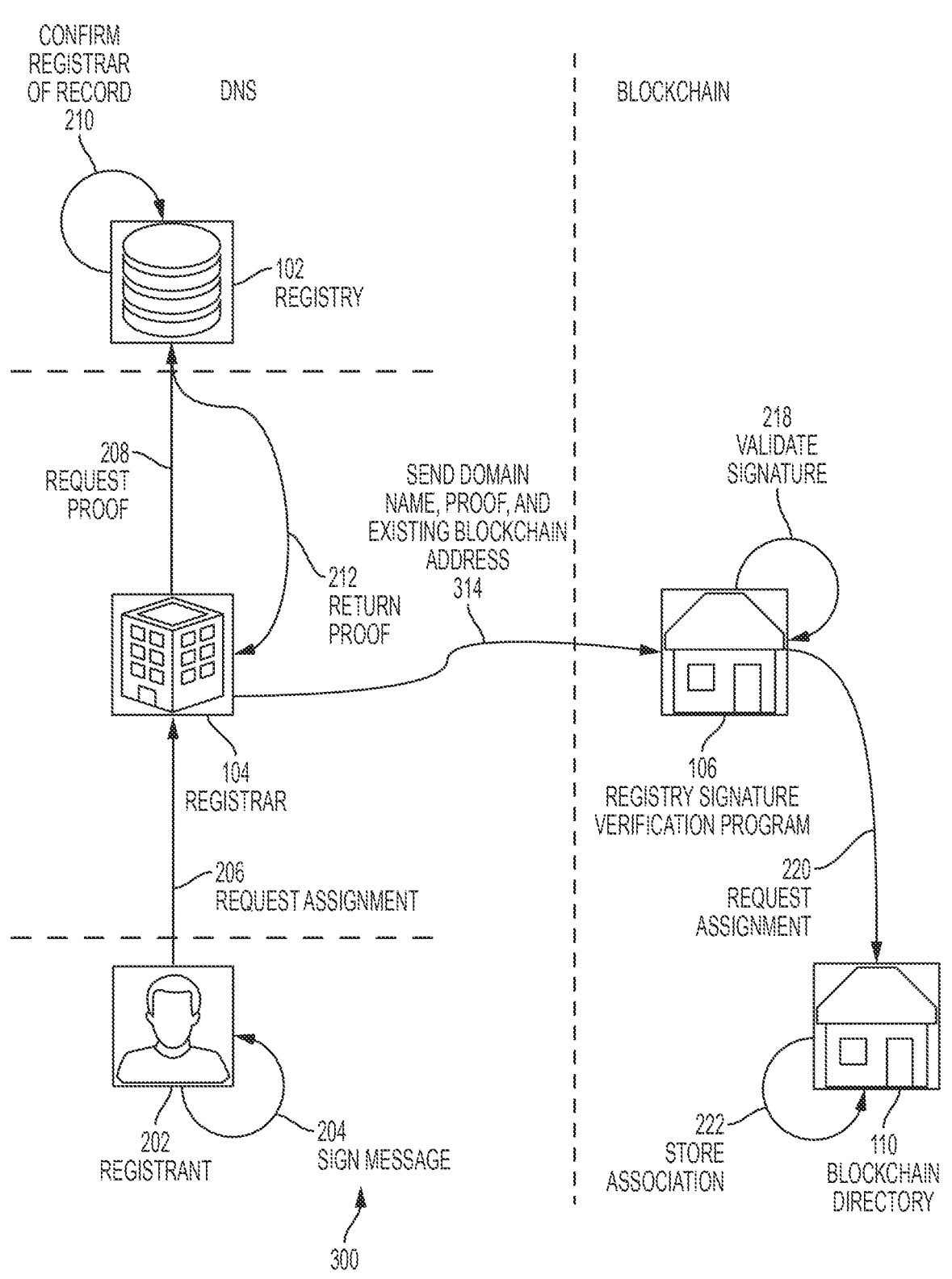
FIG. 3 is a hybrid diagram of a registrar facilitated method for associating a DNS domain name registered to a registrant as a blockchain address according to various embodiments.
Figure 4:
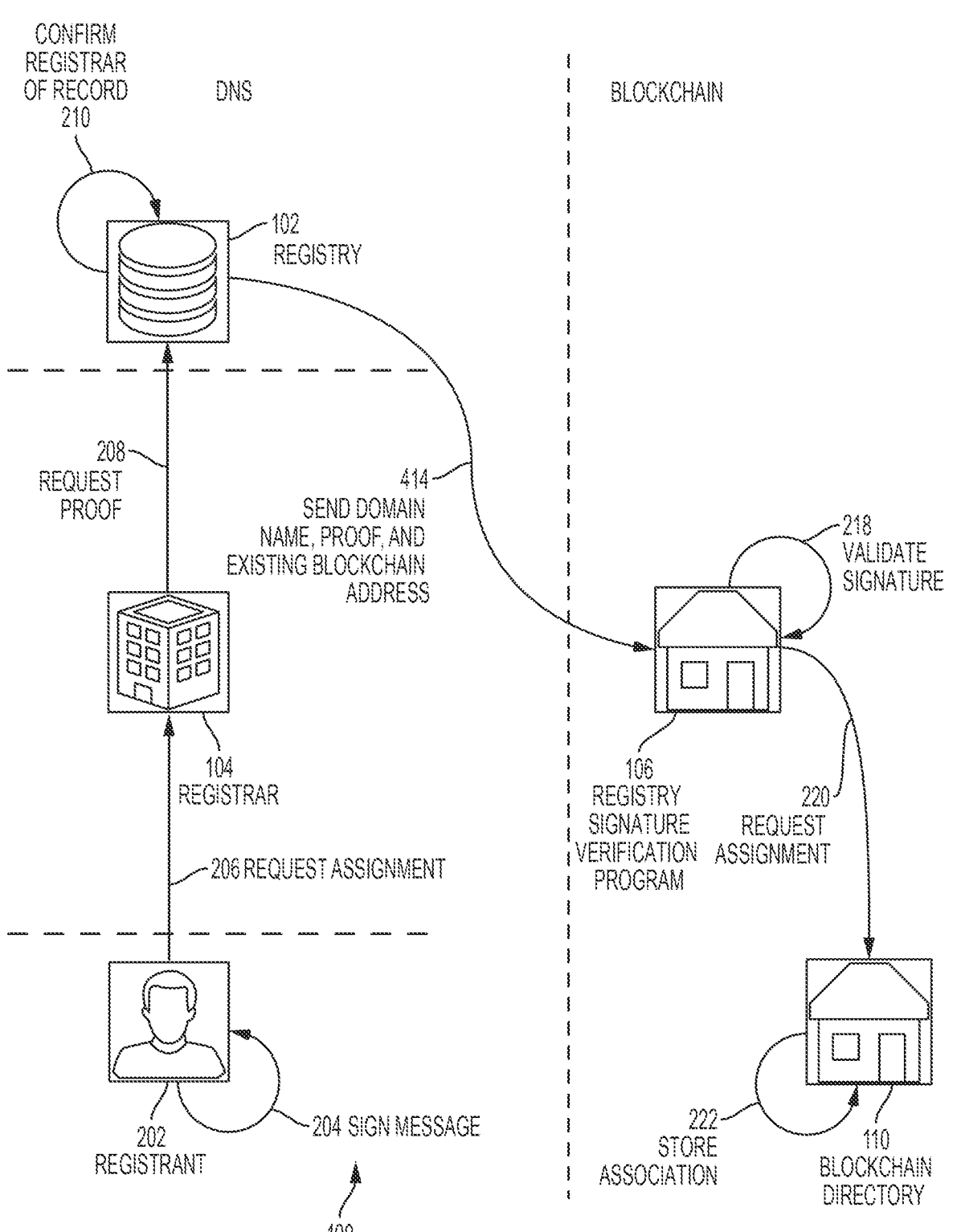
FIG. 4 is a hybrid diagram of a registry facilitated method for associating a DNS domain name registered to a registrant with a blockchain address according to various embodiments.

FIG. 3 is a hybrid diagram of a registrar facilitated method 300 for associating a DNS domain name registered to registrant 202 with a blockchain address according to various embodiments. The entities and steps depicted in the hybrid diagram that share identifying numerals with the entities and steps depicted in the hybrid diagram of FIG. 2 are described in detail above in reference to FIG. 2. Further, method 300 is essentially identical or similar to method 200 up to the point at which registry 102 returns 212 the proof to registrar 104, except that registrant 202 includes their existing blockchain address in the request 206 association message, which inclusion is optional in method 200. Therefore, description of method 300 proceeds by describing the features that are unique to method 300.

After registrar 104 receives the proof returned 212 from registry 102, instead of sending 214 the proof to registrant 202 as per method 200, registrar 104 forms a message and sends 314 it to signature verification program 106. In particular, registrar 104 may form a message that includes at least one or more of the proof, the domain name, and the address. Registrant 202 sends 216 the message to signature verification program 106.

The remaining steps of method 300 are as described above in reference to method 200 of FIG. 2.

FIG. 4 is a hybrid diagram of a registry facilitated method 400 for associating a DNS domain name registered to a registrant 202 with a blockchain address according to various embodiments. Like the hybrid diagram of FIG. 3, the entities and steps depicted in the hybrid diagram of FIG. 4 that share identifying numerals with the entities and steps depicted in the hybrid diagram of FIG. 2 are described in detail above in reference to FIG. 2. Further, method 400 is similar to method 200 up to the point at which registry 102 confirms 210 the registrar of record, with the following exceptions. First, as in method 300, per method 400, registrant 202 also includes their existing blockchain address in the request 206 association message. Second, registrant 202 includes an identification of the relevant blockchain in the request 206 association message, a datum that is optional in some embodiments of method 200. Third, instead of request proof message 208 in the form of and extended EPP Info command, registrar 104 may send an extended EPP Create command to registry 102. According to some embodiments, such an extended EPP Create command may return a registrar of record proof.

In general, the extended EPP Create command may accept as input one or more triples. For example, a triple may be of the form ([domain name], [blockchain address], [blockchain identification]). According to some embodiments, the extended EPP Create command may also accept as input a proof of blockchain address ownership, which may be added to the parameters of a triple to form a quadruple of parameters. According to some embodiments, the extended EPP Create command may carry the implicit instruction that registry 102 pushes the association, including the proof of registrar of record, to the blockchain, rather than registrant 202 or registrar 104. According to other embodiments, the extended EPP Create command directs registry 102 to generate a registrar of record proof and provide it to an entity, such as registrar 104 or registrant 202, for forwarding to signature verification program 106.

The description of method 400 proceeds by further describing the features that are unique to method 400.

Per method 400, after registry 102 confirms 210 the registrar of record, instead of returning 212 the proof to registrar 104 as per methods 200 and 300, registry 102 may form a message and send 414 it to signature verification program 106. In particular, registry 102 may form a message that includes, for example, the proof, the domain name, and the address.

The remaining steps of method 400 are as described above in reference to method 200 of FIG. 2.

Figure 5:
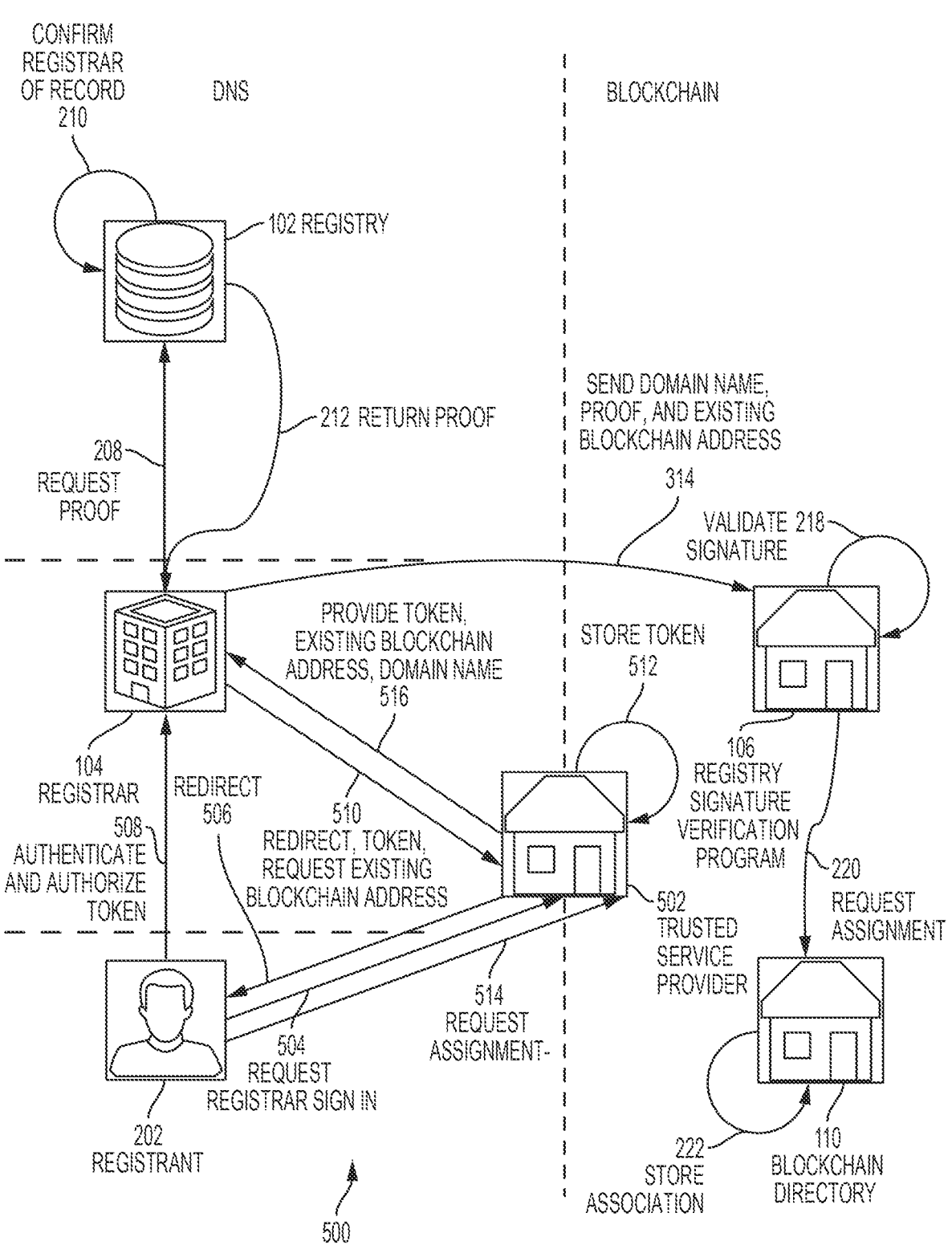
FIG. 5 is a hybrid diagram of a trusted service provider facilitated method for associating a DNS domain name registered to a registrant with a blockchain address according to various embodiments.

FIG. 5 is a hybrid diagram of a trusted service provider 502 facilitated method 500 for associating a DNS domain name registered to a registrant with a blockchain address according to various embodiments. The trusted service provider 502 may be, for example, a DNS operator, a website hosting provider, a resolver, or a different type of provider that is trusted by its users. Method 500 also involves registry 102, registrar 104, signature verification program 106, and blockchain directory 110, as described above in reference to FIGS. 1 and 2. Method 500 may be initiated by a registrant such as registrant 202. Some or all of the actions performed by registrant 202 in method 500 may be performed through or by the registrant's wallet according to some embodiments. According to other embodiments, the communications between registrant 202 and trusted service provider 502 may be performed through a web-based user interface provided by trusted service provider 502, which registrant 202 interacts with through a browser executing on registrant's client computer. In contrast to the basic embodiments of methods 200, 300, and 400, method 500 utilizes an authorization or access token, as explained presently.

Method 500 may begin with registrant 202 requesting 504 that trusted service provider 502 sign in to, or otherwise authenticate with, registrar 104. As with other embodiments described herein, registrar 104 may be the registrar of record of the domain name registered to registrant 202. In response, trusted service provider 02 redirects 506 the registrant's browser to registrar 104, for example, to an authentication or sign in web page of registrar 104.

Next, per method 500, registrant 202 may sign in to, or otherwise authenticate 508 with, registrar 104. If registrant 202 does not already have an existing account with registrar 104, an account may be established by registrant 202 at this point before proceeding. The signing in (or authenticating) may include, for example, registrant 202 providing a user name and a password for their account with registrar 104. Further, registrant 202 may authorize 508 registrar 104 to generate an access token for use by trusted service provider 502 to facilitate the blockchain user name association. The access token may be, for example, an Open Authorization (OAuth) access token according to some embodiments.

Next, per method 500, trusted service provider 502 redirects 510 the registrant's browser back to trusted service provider 502, and passes it the access token. Further, registrar 104 may request the existing blockchain address of registrant 202 at this stage. According to an embodiment, trusted service provider 502 may store 512 the access token for future access to registrar 104.

Either at this point in method 500, or previously in method 500, registrant 202 may request 514 that their registered domain name be associated with its blockchain address. The request may include, for example, the existing blockchain address of registrant 202, or registrant 202 may have previously provided that information to trusted service provider 502.

After trusted service provider 502 has the access token and the existing blockchain address of registrant 202, and registrant 202 has requested the association, trusted service provider 502 provides 516 the access token, the existing blockchain address of registrant 202, and the domain name to registrar 104.

At this point in method 500, the remaining steps are similar to those of method 300 as shown and described above in reference to FIG. 3.

Figure 6:
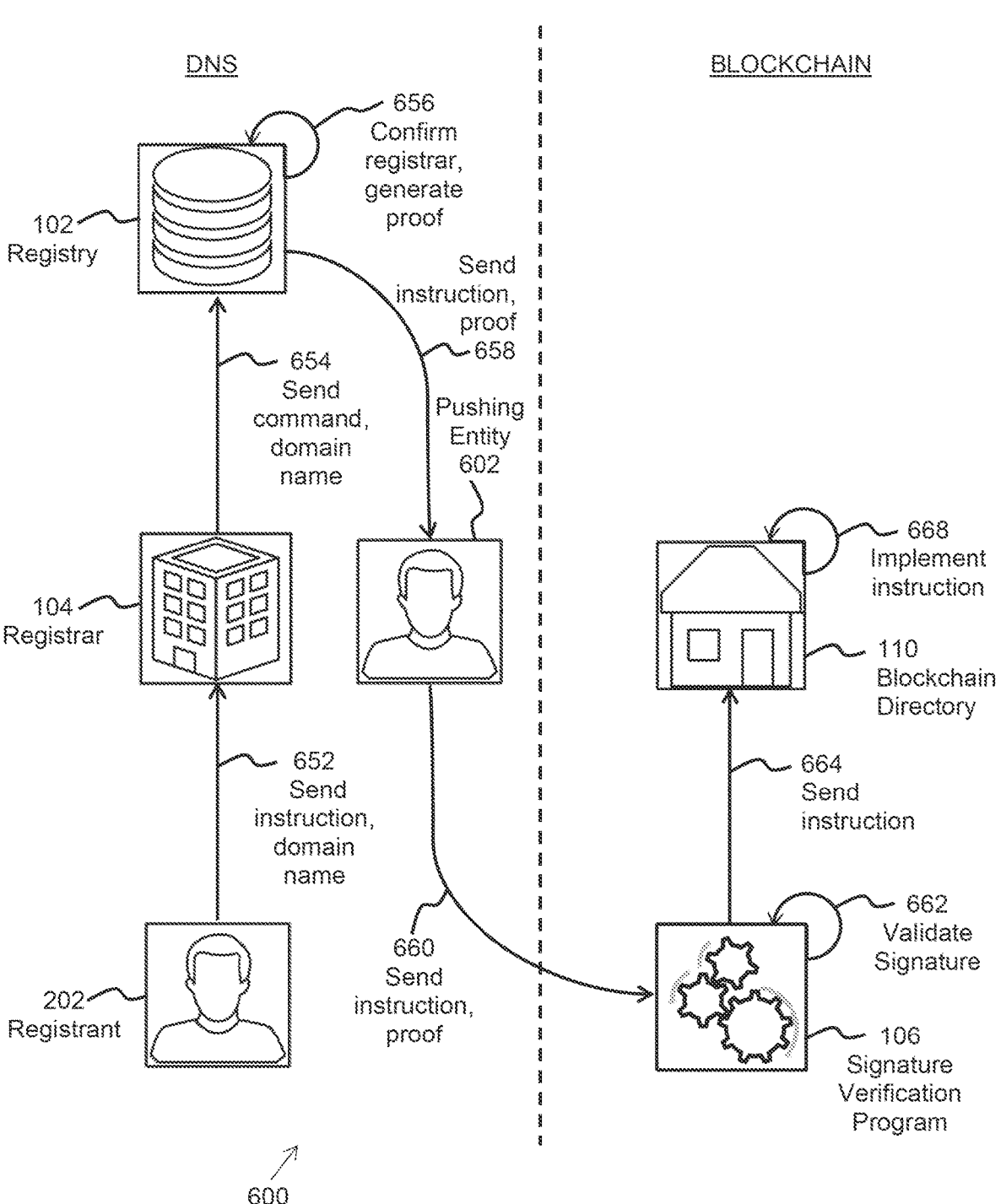
FIG. 6 is a hybrid diagram of a method for performing administrative actions on an association of a DNS domain name with blockchain address according to various embodiments.

IV. Execution Phase Creating, Deleting, Updating, Transferring, and Renewing an Association FIG. 6 is a hybrid diagram of a technique 600 for performing administrative actions on an association of a DNS domain name with blockchain address according to various embodiments. In particular, FIG. 6 depicts a general technique that can be used to create, delete, update, transfer, or renew such an association. Each of these operations is described in detail individually below. Note that the entities depicted in the FIG. 6 that share identifying numerals with the entities depicted in FIG. 2 are described in detail above in reference to FIG. 2.

As noted above in reference to FIG. 2, any entity can push data to signature verification program 106. Signature verification program 106 does not require that messages come from any particular source. Accordingly, FIG. 6 depicts pushing entity 602, which may be registry 102, registrar 104, registrant 202, any trusted service provider, or any other entity. In general, after registry generates a registrar of record proof, pushing entity pushes the proof and any associated data to signature verification program 106.

By way of non-limiting example, method 600 is shown and described in reference to registrant 202 initiating actions. However, embodiments are not so limited. Any entity can initiate the action, such as registrar 104, registry 102, or a trusted service provider, e.g., trusted service provider 502 as shown and described above in reference to FIG. 5.

Method 600 is further described in reference to the individual operations of create, delete, update, transfer, and renew presently.

A. Create

Method 600 may be used to create an association of a blockchain address with a domain name, as shown and described above in reference to FIGS. 2-5. Thus, FIG. 6 depicts the actions of these figures in a generalized manner. Method 600 for creating an association may be implemented using a create request, such as an extended EPP Create command, as described above in reference to FIGS. 2-5.

By way of non-limiting example, method 600 for creating an association may begin with registrant 202 sending 652 a create instruction to registrar 104. The instruction may be sent through a user interface provided by registrar 104, for example. The create instruction may include at least a domain name and a blockchain address, as well as an indication that the requested operation is that of creating an association of the blockchain address with the domain name. The instruction may further include an identification of a respective blockchain. According to some embodiments, registrant 202 may sign the create instruction, or a representation thereof, as part of sending 652. This signature may be validated by any of registry 102, registrar 104, or signature verification program 106. The validation may take place when the respective entity receives the data according to the flow of method 600 as described herein. If the signature is valid, then method 600 may proceed as described; otherwise, the method 600 may halt with an error message. The actions of the sending 652 may be the same as or similar to those of request association 206 as shown and described above in reference to FIG. 2.

Next, per method 600 for creating an association, registrar 104 parses the instruction and generates a corresponding command for sending 654 to registry 102. According to some embodiments, registrar 104 may sign the command, or a representation thereof, as part of sending 654. This signature may be validated by either registry 102 or signature verification program 106. The validation may take place when the respective entity receives the data according to the flow of method 600 as described herein. If the signature is valid, then method 600 may proceed as described; otherwise, the method 600 may halt with an error message. According to some embodiments, the command may be in the form of an extended EPP Create command, as describe above in reference to FIG. 4. According to some embodiments, for the extended Create command, registry 102 may generate and return a registrar of record proof back to registrar 104; for the extended EPP Info command, registry 102 may generate and send the registrar of record proof to any entity for pushing to signature verification program 106. In either case, registrar 104 may send 654 a command that includes the domain name, the blockchain address, and possibly an identification of a respective blockchain to registry 102. If the command is in the form of an extended EPP Create command, registry 102 may perform the usual DNS-environment domain creation operations, if the command so indicates, after it obtains and possibly validates the instruction. Further operations that affect the blockchain environment may occur as follows.

Next, per method 600 for creating an association, registry 102 confirms 656 that the message originated at the registrar of record for the domain name. The actions of confirming 656 may be the same or similar as those of confirming 212 the registrar of record as shown and described above in reference to FIG. 2. If the confirmation is unsuccessful, registry 102 may return an error message, otherwise, registry 106 may generate a registrar of record proof, and method 600 may proceed as follows. According to an embodiment, if the extended EPP Create command is used to implement a registration of the domain name, then the registrar of record for the domain name will be the registrar that issued the command, in which case the confirmation may always be successful.

Next, per method 600 for creating an association, registry 106 sends an instruction (e.g., including the domain name and blockchain address) and the registrar of record proof to pushing entity 602. As noted above, pushing entity may be any entity, e.g., registry 102, registrar 104, or registrant 202. For registry 102, the sending 658 may be omitted or handled internal to registry 102, and method 600 may proceed as shown and described in reference to registry facilitated method 400 of FIG. 4. For registrar 104, method 600 may proceed as shown and described in reference to registrar facilitated method 300 of FIG. 3. For registrant 202, method 600 may proceed as shown and described above in reference to registrant facilitated method 200 of FIG. 2. For the latter case, where pushing entity is registrant 202, registry 102 may send 658 the instruction and registrar of record proof to registrant 202 via registrar 104.

Next per method 600 for creating an association, and regardless as to the identity of pushing entity 602, pushing entity 602 proceeds to send 660 a corresponding instruction and the registrar of record proof to registry signature verification program 106. The instruction may include the domain name and blockchain address for which the association is sought, as well as an indication that the requested operation is that of creating an association. This may be accomplished via any suitable communication channel and protocol.

Next, per method 600 for creating an association, signature verification program 106 validates 662 the signature. The actions of the validating 662 of method 600 for creating an association may be the same as or similar to the actions of validating 218 as shown and described above in reference to FIG. 2. If the validation is successful, then method 600 may proceed as follows.

Next, per method 600 for creating an association, signature verification program 106 sends 664 an instruction to blockchain directory 110 to store the association. The actions of the sending 664 may be the same or similar to those of requesting 220 association as shown and described above in reference to FIG. 2.

Next, per method 600 for creating an association, blockchain directory 110 implements 356 the instruction to associate the provided domain name with the provided blockchain address. The actions of implementing 356 the instruction may be the same as or similar to the actions of storing 222 the association, as shown and described above in reference to FIG. 2.

This may complete method 600 for creating an association.

B. Delete

Method 600 may be used to delete association(s) of a domain name with one or more blockchain addresses for one or more respective blockchains. Further, method 600 for deleting associations may be implemented using a delete request, such as an extended EPP Delete command. No new values need to be passed in such an extended EPP Delete command. However, registry 102 may store a list of existing associations of domain names under its authority to blockchain addresses in one or more blockchains.

By way of non-limiting example, method 600 for deleting associations may begin with registrant 202 sending 652 a delete instruction to registrar 104. According to some embodiments, registrant 202 may sign the delete instruction, or a representation thereof, as part of sending 652. The instruction may be sent through a user interface provided by registrar 104, for example. The delete instruction may include at least a domain name as well as an indication that the requested operation is that of deleting associations of blockchain addresses with the domain name. The delete instruction may further possibly include one or more blockchain addresses and identifications of respective blockchains, although such data may be omitted if registry 102 stores a list of associations for the domains under its authority. The actions of the sending 652 may be the same as or similar to those of request association 206 as shown and described above in reference to FIG. 2. In particular, registrant 202 may send 652 the request message with the noted data to registrar 104. The message may also include a proof of blockchain address ownership, as described above in reference to FIG. 2.

Next, per method 600 for deleting associations, registrar 104 parses the instruction and generates a corresponding command for sending 654 to registry 102. According to some embodiments, registrar 104 may sign the command, or a representation thereof, as part of sending 654. The command may be in the form of a delete request, such as an extended EPP Delete command, described further immediately below. Registrar then 104 sends 654 the command, which includes at least the domain name, and possibly identifications of blockchains and blockchain addresses, to registry 102. If the command is in the form of an extended EPP Delete command, registry 102 may perform the usual DNS-environment domain registration deletion operations, if the command so indicates, after it obtains and possibly validates the instruction. Further operations that affect the blockchain environment may occur as follows.

Next, per method 600 for deleting associations, registry 102 confirms 656 that the message originated at the registrar of record for the domain name. The actions of confirming 656 may be the same as or similar to those of confirming 212 the registrar of record as shown and described above in reference to FIG. 2. If the confirmation is unsuccessful registry may return an error message, otherwise, registry 106 may proceed to execute the extended EPP Delete command. To do so, registry 102 may send, via pushing entity 602, a delete instruction to one or more blockchains (e.g., to respective signature verification programs 106 of one or more blockchains) that have blockchain addresses associated with the domain name. Registry 102 may identify such blockchains by reading their identifications from the received instruction, for embodiments that include such identifications in the instruction, or by looking up such blockchains in a stored list of existing associations of blockchain addresses for one or more blockchains to domain names under the authority of registry 102. After the relevant blockchains are identified, registry 106 may proceed to generate a registrar of record proof, and method 600 may proceed as follows.

Next, per method 600 for deleting associations, registry 106 sends an instruction (including the domain name and possibly blockchain addresses and blockchain identifications) and the registrar of record proof to pushing entity 602. As described above, pushing entity may be any entity, e.g., registry 102, registrar 104, or registrant 202. For registry 102, the sending 658 may be omitted or handled internal to registry 102, and method 600 may send the instruction to signature verification program 106 as shown and described in reference to registry facilitated method 400 of FIG. 4. For registrar 104, method 600 may send the instruction to signature verification program 106 as shown and described in reference to registrar facilitated method 300 of FIG. 3. For registrant 202, method 600 may send the instruction to signature verification program 106 as shown and described above in reference to registrant facilitated method 200 of FIG. 2. For the latter case, where pushing entity is registrant 202, registry 102 may send 658 the instruction and registrar of record proof to registrant 202 via registrar 104.

Next per method 600 for deleting associations, and regardless as to the identity of pushing entity 602, pushing entity 602 proceeds to send 660 a corresponding instruction and the registrar of record proof to a respective registry signature verification program 106 in all blockchains listed in the instruction (e.g., as specified by registrant 202 or identified by registry 102). The corresponding instruction sent to each respective signature verification program 106 may include the domain name and an indication that the requested operation is that of deleting an association of the domain name with all blockchain addresses in the respective blockchain. The sending 660 may be accomplished via any suitable communication channel and protocol. Method 600 for deleting associations is described further in reference to interactions with a single blockchain; however, similar actions may be performed for all blockchains listed in the instruction.

Next, per method 600 for deleting associations, signature verification program 106 validates 662 the signature. The actions of the validating 662 of method 600 for creating an association may be the same as or similar to the actions of validating 218 as shown and described above in reference to FIG. 2. If the validation is successful, then method 600 may proceed as follows.

Per method 600 for deleting associations, signature verification program 106 sends 664 an instruction to blockchain directory 110 to delete all associations for the domain name. The actions of the sending 664 may be essentially identical to those of requesting 220 association as shown and described above in reference to FIG. 2.

Next, per method 600 for deleting associations, blockchain directory 110 implements 356 the instruction to delete any associations to the provided domain name. Depending on how blockchain directory 110 is set up, the actions of implementing 356 the instruction may include sending a command to a smart contract that controls blockchain directory 110, or may include performing the deletions directly in a data store, such as a table in a database, that stores the information of blockchain directory 110. The deletions may be implemented 356 by setting the registrant of the domain name to empty, null, the blockchain address of signature verification program 106, or any other placeholder that indicates no association.

According to some embodiments, method 600 for deleting associations may further include cleaning other associations. For example, some blockchains have resolvers that point to associations of names to blockchain addresses. For such blockchains, method 600 for deleting associations may further include deleting such associations in such resolvers.

This may complete method 600 for deleting associations.

C. Expiration

Expiration may be considered as a type of deletion. However, instead of being initiated by an action outside of registry 102, e.g., by registrant 202, operations associated with expiration may be initiated by registry 102 detecting the expiration of a domain name registration in the DNS environment. Thus, the operations associated with expiration may be initiated after registry 102 determines that registration in the DNS for the domain name has expired. More particularly, such initiation may occur, e.g., after registry 102 purges its records of the DNS registration for the domain name.

The operations associated with expiration may include those of the Delete extended EPP command, as described above in Section IV (B). More particularly, registry 102 may generate a registrar of record proof and send 658 the proof along with a delete instruction to pushing entity 602. The remaining actions may be as described above in Section II (B), starting with pushing entity 602 receiving the proof and delete instruction.

D. Update

Method 600 may be used to update an association of a domain name with a blockchain address. The update may include adding an association, removing an association, or modifying an association of a domain name with a blockchain address. Method 600 for updating associations may be implemented using an update request, such as an extended EPP Update command. Such an extended EPP Update command may accept parameters in addition to the usual EPP Update command parameters. By way of non-limiting example, the extended EPP Update command may accept any of the following ordered triple types:

one or more ([blockchain identification], [domain name], [blockchain address]) to add association(s);

one or more ([blockchain identification], [domain name], [blockchain address]) to remove association(s); or one or more ([blockchain identification], [domain name], [blockchain address]) to change association(s).

Operations of the extended Update command for each such triple are described further below. According to various embodiments, the extended update command may accept one or more additional arguments, e.g., a registrant signature proving control of the blockchain address. Such additional arguments may be incorporated to form an n-tuple, where n is any number greater than two, for example.

By way of non-limiting example, method 600 for updating associations may begin with registrant 202 sending 652 an update instruction to registrar 104. According to some embodiments, registrant may sign the update instruction, or a representation thereof, as part of sending 652. The instruction may be sent through a user interface or API provided by registrar 104, for example. The update instruction may include an indication that the requested operation is that of updating associations of blockchain addresses with domain names, and may include identifications of one or more domain names, blockchain addresses, and respective blockchains that are to be added, removed, and/or changed. The actions of the sending 652 may be the same as or similar to those of request association 206 as shown and described above in reference to FIG. 2. The message may also include a proof of blockchain address ownership, as described above in reference to FIG. 2, for each blockchain address provided in the instruction.

Next, per method 600 for updating associations, registrar 104 parses the instruction and generates a corresponding command for sending 654 to registry 102. The command may be in the form of an extended EPP Update command. According to some embodiments, registrar 104 may sign the command, or a representation thereof, as part of sending 654. Registrar then 104 sends 654 the command, which may include lists of ordered triples as set forth above (or in a different arrangement that conveys the same information), to registry 102. If the command is in the form of an extended EPP Update command, registry 102 may perform the usual DNS-environment domain update operations, if the command so indicates, after it obtains and possibly validates the instruction. Further operations that affect the blockchain environment may occur as follows.

Next, per method 600 for updating associations, registry 102 confirms 656 that the message originated at the registrar of record for the domain name provided in the Update instruction. The actions of confirming 656 for an individual domain name may be the same as or similar to those of confirming 212 the registrar of record as shown and described above in reference to FIG. 2. According to some embodiments, if the confirmation 656 fails, then method 600 halts and registry 102 may return an error message. Otherwise, registry 106 may proceed to execute the extended Update command.

To do so, registry 102 may send, via pushing entity 602, corresponding update instructions to respective signature verification programs at one or more blockchains. Registry 102 may first identify the relevant blockchains. For embodiments that utilize the extended EPP Update command with the fields identified above, registry may obtain the identities of the blockchains directly from the provided information. For other embodiments, registry 102 may obtain the identities of the blockchains for which updates are to be made by looking up the domain name(s) identified in the update in a stored list of existing associations of blockchain addresses for one or more blockchains to domain names under the authority of registry 102. After registry 102 identifies the relevant blockchains, registry 106 may proceed to generate a registrar of record proof, and send instructions to the respective signature verification programs.

In particular, registry 102 may send instructions for each of the add, remove, and change components of the Update command. For associations of domain names with blockchain addresses that are to be added, registry 102 forms an instruction to add such an association. The instruction for adding an association may include the domain name, the blockchain address, and the blockchain identification, and may be essentially identical to that used to implement the extended EPP Create command, described above. For associations of domain names with blockchain addresses that are to be removed, registry 102 forms an instruction to remove the association of the identified blockchain address with the identified domain name. The instruction for removing an association may include the domain name, the blockchain address, and the blockchain identification and may indicate that a single association in a single blockchain is to be removed. This may differ from the extended Delete command described above, in which all associations for the provided domain name may be deleted. For associations of domain names with blockchain addresses that are to be changed, registry 102 forms an instruction to replace any existing blockchain address associated with the provided domain name with the provided blockchain address. The instruction for changing an association may include the domain name, the blockchain address, and the blockchain identification, and may indicate that any existing association of the domain name with a blockchain address is to be replaced with an association of the domain name with the identified blockchain address. After registry 102 forms the appropriate instructions, it proceeds to send them to pushing entity 602 (unless, for example, registry 102 includes pushing entity 602) along with the registrar of record proof for dispatch to the signature verification programs at the relevant blockchains.

Thus, per method 600 for updating associations, registry 106 sends the instructions formed as described above to pushing entity 602. As noted above, pushing entity may be any entity, e.g., registry 102, registrar 104, or registrant 202. For registry 102, the sending 658 may be omitted or handled internal to registry 102, and method 600 may send the instructions to signature verification program 106 as shown and described in reference to registry facilitated method 400 of FIG. 4. For registrar 104, method 600 may send the instructions to signature verification program 106 as shown and described in reference to registrar facilitated method 300 of FIG. 3. For registrant 202, method 600 may send the instructions to signature verification program 106 as shown and described above in reference to registrant facilitated method 200 of FIG. 2. For the latter case, where pushing entity is registrant 202, registry 102 may send 658 the instruction and registrar of record proof to registrant 202 via registrar 104.

Next per method 600 for updating associations, and regardless as to the identity of pushing entity 602, pushing entity 602 may send 660 corresponding instructions and the registrar of record proof to a respective registry signature verification program 106 in all identified blockchains.

The corresponding instruction sent to each respective signature verification program 106 may include a domain name and blockchain address and an indication of the requested operation, e.g., add, remove, or change. The sending 660 may be accomplished via any suitable communication channel and protocol. Method 600 for updating associations is described further in reference to interactions with a single blockchain; however, similar actions may be performed for all blockchains listed in the instruction.

Next, per method 600 for updating associations, signature verification program 106 validates 662 the signature in the registrar or record proof. The actions of the validating 662 of method 600 for creating an association may be the same as or similar to the actions of validating 218 as shown and described above in reference to FIG. 2. If the validation is successful, then method 600 may proceed as follows.

Per method 600 for updating associations, signature verification program 106 sends 664 an instruction to blockchain directory 110 for each requested operation. The actions of the sending 664 may be essentially identical to those of requesting 220 association as shown and described above in reference to FIG. 2.

Next, per method 600 for updating associations, blockchain directory 110 implements 356 the actions indicated by the instruction to add, remove, and/or change any associations to the provided domain name. Depending on how blockchain directory 110 is set up, the actions of implementing 356 the instruction may include sending a command to a smart contract that controls blockchain directory 110, or may include performing the deletions directly in a data store, such as a table in a database, that stores the information of blockchain directory 110.

The actions of implementing 356 an add instruction may be the same as or similar to the actions of storing 222 the association, as shown and described above in reference to FIG. 2. The actions of implementing 356 a removal instruction may include setting the registrant of the domain name to empty, null, the blockchain address of signature verification program 106, or any other placeholder that indicates no association. The actions of implementing 356 a change instruction may be the same as or similar to the actions of storing 222 the association, as shown and described above in reference to FIG. 2, where any existing blockchain address associated with the provided domain name is replaced by the provided blockchain address.

This may complete method 600 for updating associations.

E. Transfer

Method 600 may be used to transfer association(s) of a domain name with one or more blockchain addresses for one or more respective blockchains. Further, method 600 for transferring associations may be implemented using a transfer request, such as an extended EPP Transfer command. No new values need to be passed in such an extended EPP Transfer command; the existing parameters that include an identification of a domain name, a losing registrant, and a gaining registrant may be used for the extended Transfer command.

The extended transfer command may be handled as an extended Delete command as described above in Section IV (B), except that registry 102 may perform the usual DNS-environment domain transfer operations, if the command so indicates, after it obtains and possibly validates the command sent 654 from registrar 104. Thus, the extended EPP Transfer command may remove all associated blockchain addresses from an identified domain name. Any new registrant may establish new associations with their own blockchain address(es), e.g., using an extended EPP Update command as described herein.

According to some embodiments, the gaining and losing registrant may be queried (e.g., via email or via a registrar user interface) as to whether they wish to retain the existing blockchain address associations when the domain name is transferred between registrants. For example, registrar 104 may receive a transfer instruction, and proceed to send such queries prior to execution thereof. If both parties agree to retain the existing associated blockchain addresses, then no actions may be performed in the blockchain environment. If at least one of the parties disagrees, then the extended Transfer command may be sent to registry 102, and the associations removed, e.g., as described above with respect to the extended Delete command.

F. Renew

Some embodiments do not include an extended EPP Renew command, e.g., because renewing registration of a domain name may not include changing any parameters for the domain name that are stored in the blockchain environment. For example, the blockchain environment may not store an expiration for the association of the domain name with the blockchain address.

Some embodiments include an extended Renew EPP command. In such embodiments, the extended Renew command may update an expiration datum for an association of the domain name with a blockchain address as recorded in the blockchain environment. For example, some blockchains may store an expiration, e.g., in terms of date and time, for each stored association of a domain name with a blockchain address. Some embodiments may store expiration of registration of the domain name as the expiration of the blockchain address association. When the domain name registration is renewed at the registry using an extended Renew command, method 600 may be used to update the expiration date of the association stored in the blockchain environment.

By way of non-limiting example, method 600 for renewing an association may begin with registrant 202 sending 652 a renew instruction to registrar 104. According to some embodiments, registrant 202 may sign the create instruction, or a representation thereof, as part of sending 652. The instruction may be sent through a user interface provided by registrar 104, for example. The renew instruction may include at least a domain name and a blockchain address, as well as an indication that the requested operation is a renewal. According to some embodiments, the instruction may further include an identification of one or more blockchains for which expirations are to be renewed. According to some embodiments, registry 102 may store a list of existing associations of domain names under its authority to blockchain addresses in one or more blockchains. According to such embodiments, registry obtains identifications of the blockchains that store associations that are to be renewed from the list. The actions of the sending 652 may be the same as or similar to those of request association 206 as shown and described above in reference to FIG. 2.

Next, per method 600 for creating an association, registrar 104 parses the instruction and generates a corresponding command for sending 654 to registry 102. For example, registrar 104 may change the format of the instruction to the proper form of the command for receipt and interpretation by registry 102, such as in the form of an EPP command. According to some embodiments, registrar 104 may sign the command, or a representation thereof, as part of sending 654. The command may be in the form of an extended EPP Renew command. Registrar 104 sends 654 a command that includes the domain name, the blockchain address, and possibly an identification of a respective blockchain to registry 102. If the command is in the form of an extended EPP Renew command, registry 102 may perform the usual DNS-environment domain registration renew operations, if the command so indicates, after it obtains and possibly validates the instruction. Further operations that affect the blockchain environment may occur as follows.

Next, per method 600 for creating an association, registry 102 confirms 656 that the message originated at the registrar of record for the domain name. The actions of confirming 656 may be the same as or similar to those of confirming 212 the registrar of record as shown and described above in reference to FIG. 2. If the confirmation is unsuccessful registry may return an error message, otherwise, registry 106 may generate a registrar of record proof, and method 600 may proceed as follows.

Next, per method 600 for creating an association, registry 106 sends an instruction (including, for example, the domain name and possibly any associated blockchain addresses and/or blockchain identifications) and the registrar of record proof to pushing entity 602. As described above, pushing entity may be any entity, e.g., registry 102, registrar 104, registrant 202, etc. For registry 102, the sending 658 may be omitted or handled internal to registry 102, and method 600 may proceed as shown and described in reference to registry facilitated method 400 of FIG. 4. For registrar 104, method 600 may proceed as shown and described in reference to registrar facilitated method 300 of FIG. 3. For registrant 202, method 600 may proceed as shown and described above in reference to registrant facilitated method 200 of FIG. 2. For the latter case, where pushing entity is registrant 202, registry 102 may send 658 the instruction and registrar of record proof to registrant 202 via registrar 104.

Next per method 600 for renewing an association, and regardless as to the identity of pushing entity 602, pushing entity 602 proceeds to send 660 a corresponding instruction and the registrar of record proof to registry signature verification program 106. The instruction may include the domain name and possibly a blockchain address for which the association is to be renewed, as well as an indication that the requested operation is that of renewing the association. This may be accomplished via any suitable communication channel and protocol.

Next, per method 600 for renewing an association, signature verification program 106 validates 662 the signature. The actions of the validating 662 of method 600 for creating an association may be the same as or similar to the actions of validating 218 as shown and described above in reference to FIG. 2. If the validation is successful, then method 600 may proceed as follows.

Next, per method 600 for creating an association, signature verification program 106 sends 664 an instruction to blockchain directory 110 to renew the association. The actions of the sending 664 may be essentially identical to those of requesting 220 association as shown and described above in reference to FIG. 2.

Next, per method 600 for renewing an association, blockchain directory 110 implements 356 the instruction to renew any blockchain address associations with the provided domain name. The actions of implementing 356 the instruction may be include updating one or more expirations of the association. The updated expirations may represent expirations of the registration of the domain name, for example. According to an embodiment, the expirations may be set to some time that is a predetermined interval in the future. Other expirations are also possible.

This may complete method 600 for renewing an association.

Figure 7:
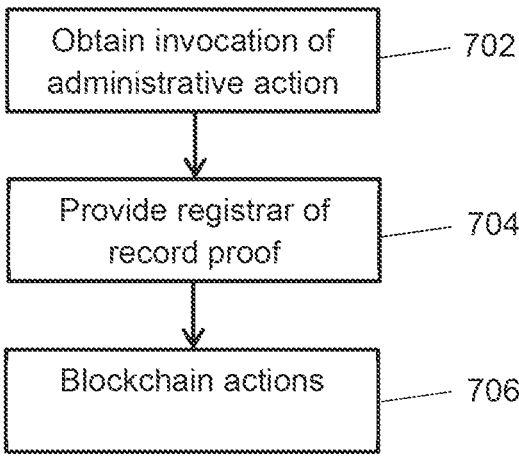
FIG. 7 is a flow diagram for a method of administering associations of domain names with blockchain addresses for a blockchain according to various embodiments.

G. Summary: Creating, Deleting, Updating, Transferring, and Renewing an Association FIG. 7 is a flow diagram for a method 700 of administering associations of domain names with blockchain addresses for a blockchain. Initial actions of method 700, e.g., 702 and 704, may be carried out by a registry, and further actions, e.g., 706, may be carried out in the blockchain environment.

At 702, method 700 may begin with a registry, such as registry 102 as shown and described in reference to FIGS. 1-6, obtaining an invocation of an administrative action regarding an association of a domain name with a blockchain address. The actions of 702 may include some or all of the actions of sending 654 as shown and described above in reference to FIG. 6. For example, the invocation may be in the form of receiving a command, e.g., an EPP command or an extended EPP command, such as Create, Update, Delete, Transfer, or Renew, sent from a registrar, e.g., registrar 104. According to some embodiments, the command may be sent 654 from registrar 104 as shown and described above in reference to FIG. 6.

At 704, the registry provides 704, in response to obtaining 702, a registrar proof message. The actions of 704 may include some or all of the actions of sending 658 as shown and described above in reference to FIG. 6. For example, according to some embodiments, the registrar proof message is in the form of a registrar of record proof, as described herein in reference to FIGS. 1-6. Thus, according to some embodiments, the registrar proof message may include a signature by a private key of the registry and may specify a registrar of record for the domain name.

At 706, method 700 may conclude with blockchain actions. The actions of 706 may include some or all of the actions of validating 662, sending 664, and implementing 668 as shown and described above in reference to FIG. 6. For example, such actions may include an executable program stored on the blockchain obtaining and verifying the signature referred to above in reference to the obtaining 702. Such an executable program may be in the form of a signature verification program such as signature verification program 106 as shown and describe herein in reference to FIGS. 1-6. Further blockchain action may include the blockchain implementing the administrative action regarding the association of the domain name with the blockchain address. Such implementation may be as shown and described herein in reference to FIGS. 2-6, for example.

Method 700 may subsequently conclude.

V. Execution Phase-Info

As described in detail herein in Section II, some embodiments provide an extended EPP Info command that instructs a registry to generate, ore return a previously generated, registrar of record proof. Some embodiments may further extend such an Info command as described presently. Some embodiments may extend a standard EPP Info command as described presently.

The extended EPP Info command described in this section may be used to obtain information describing associations of domain names with blockchain addresses. Thus, for example, the extended EPP Info command of this section may return, for each queried domain name, a list of associated blockchain addresses and identifications of their respective blockchains.

Any entity may send an extended EPP Info command described in this section to, and receive a reply, e.g., generated by a registry such as registry 102 as shown and described herein in reference to FIGS. 1-6. According to some embodiments, such an entity may be a registrar, such as registrar 104 as shown and described herein in reference to FIGS. 1-6. By way of illustration rather than limitation, an example use case of such an extended EPP Info command is described in reference to registrant 202, registrar 104, and registry 102 presently.

Figure 8:
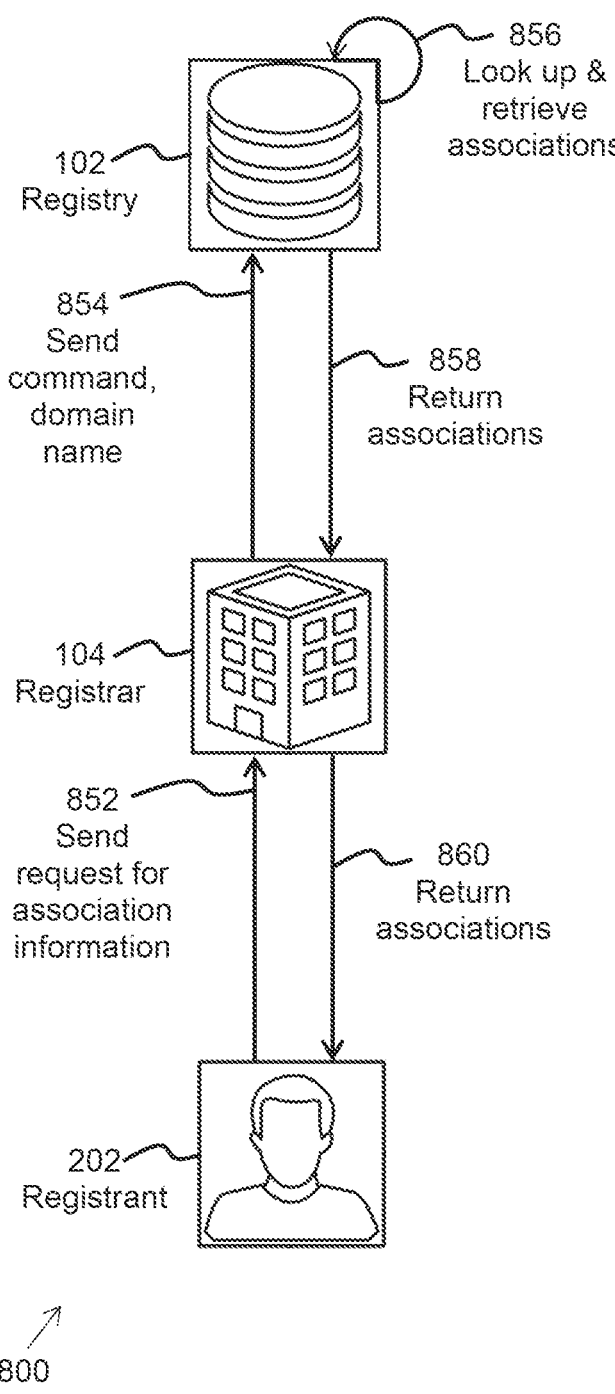
FIG. 8 is a hybrid diagram of a method for accessing information regarding associations of domain names with blockchain addresses according to various embodiments.

FIG. 8 is a hybrid diagram of a method 800 for accessing information regarding associations of domain names with blockchain addresses according to various embodiments. Method 800 may utilize an extended EPP Info command according to some embodiments.

Method 800 may begin with registrant 202 sending 852 a request for blockchain address association information regarding a domain name to registrar 104. The request may be sent via a registrar-provided user interface or API, for example. The request may identify one or more domain names.

Next, per method 800, registrar 104 parses the request and generates a corresponding command for sending to registry 102. The command may be in the form of an extended EPP Info command as presented in this section. Registrar then 104 sends 654 the command, which includes at least one domain name to registry 102.

Next, per method 800, registrar 104 sends the command to registry 102. Registry 102 receives the command, e.g., via an EPP interface or and API, and proceeds to look up 856 and retrieve information representing any blockchain addresses and their respective blockchains for the provided domain name(s).

Next, per method 800, registry returns 858 to registrar 104 any retrieved associations. If no associations exist in the records of registry 102, registry 102 may return a message so indicating. In either case, the returned information may be sent according an EPP protocol, by way of non-limiting example.

Next, per method 800, registrar returns 860 to registrant 202 the retrieved associations or error message, as the case may be. The returned information may be sent via a user interface of registrar 104, by way of non-limiting example.

This may conclude method 800.

VI. Incentives

A. Introduction

One of the problems with blockchains today is that data on the blockchain is at risk of becoming stale. In certain contexts, this stale data provides a misleading impression, e.g., that some entity is in control of something based on the information stored on the blockchain. Public blockchains may operate on fees (e.g., in cryptocurrency), so updating stale data may require some party to incur the financial cost to execute the blockchain transaction. This raises the question of who should correct stale data, but in many cases no party is incentivized to pay the fee to update the data to bring it into alignment, e.g., with an authoritative source of truth that may exist outside of the blockchain.

Blockchain data can become stale for any of a variety of reasons. For example, a domain name may be associated with a blockchain address using an embodiment as disclosed herein or using a different mechanism. If DNS registration of the domain name expires, then the blockchain and DNS are out of sync, because the blockchain still lists the previous registrant of the domain name in the DNS environment as the current registrant of the expired domain name in the blockchain environment.

Moreover, there is a risk that no one may be incentivized to clean up in this domain name registration expiration scenario. The registrant let the name expire, so it may not be incentivized. The blockchain may be providing services as a public good without charging a fee, so it may not be incentivized to pay the fees. A DNS registry or registrar may not be directly involved, so they may not be incentivized. As such, there is the risk that no one entity has sufficient incentive to clean up the stale data by removing the association that is no longer valid. Because no one entity may be sufficiently incentivized to clean up the stale data, it can potentially linger ad infinitum and reduce the integrity of the blockchain. However, if a reward is attached to this data as described herein, then anyone may submit a transaction to both clean up the stale data by removing any invalid associations and claim the associated reward. Such a reward provides an incentive to remove such invalid data from a blockchain.

As another example, an association of a blockchain address with a domain name may have an expiration in the blockchain. The expiration may indicate that the domain name is available for registration in the DNS environment, but the association may linger in the blockchain environment. Instead, expiration may open the ability for a new registrant to register the domain in the DNS environment, but the prior registrant may be able to continue to control the domain name in the blockchain environment until the domain name is reregistered. Using embodiments as disclosed herein, after expiration, any entity can remove the stale association in the blockchain and be reimbursed for the blockchain transaction fee.

Thus, some embodiments provide a mechanism where the initial party that adds the association to the blockchain also stores in the blockchain an incentive in the form of a cryptocurrency reward for certain data updates. Such a reward may be released when a particular action is not aligned with any user, e.g., deleting a stale record. For example, if it were to be released when some party is incentivized to provide the update themselves, then that party may provide the update without the reward. Since blockchain transaction fees can be pre-calculated, the minimum value to be stored in the reward/bounty can be predetermined, e.g., when the data is initially stored in the blockchain. The reward may cover at least the transaction fee for updating the blockchain.

The reward may also include an additional amount that provides a profit to the party that cleans the data when it becomes stale. Such an additional amount contributes to the incentive to clean up stale data in the blockchain. Further, there is a risk that blockchain fees can change, e.g., due to blockchain forks. In these cases, the additional amount can help to mitigate such a risk by ensuring it is more likely that the payout is financially neutral or positive. If no additional amount is included, then certain entities, e.g., a registry, may execute the transactions to keep their system clean while receiving little or no financial reward. In this case, the reward is that their system is well functioning and that should incentivize the ecosystem maintainer.

Thus, the reward mechanism disclosed in this section solves the problem of no party being incentivized to clean up or correct stale data, e.g., by providing a financial incentive for doing so.

B. Example Embodiments

Figure 9:
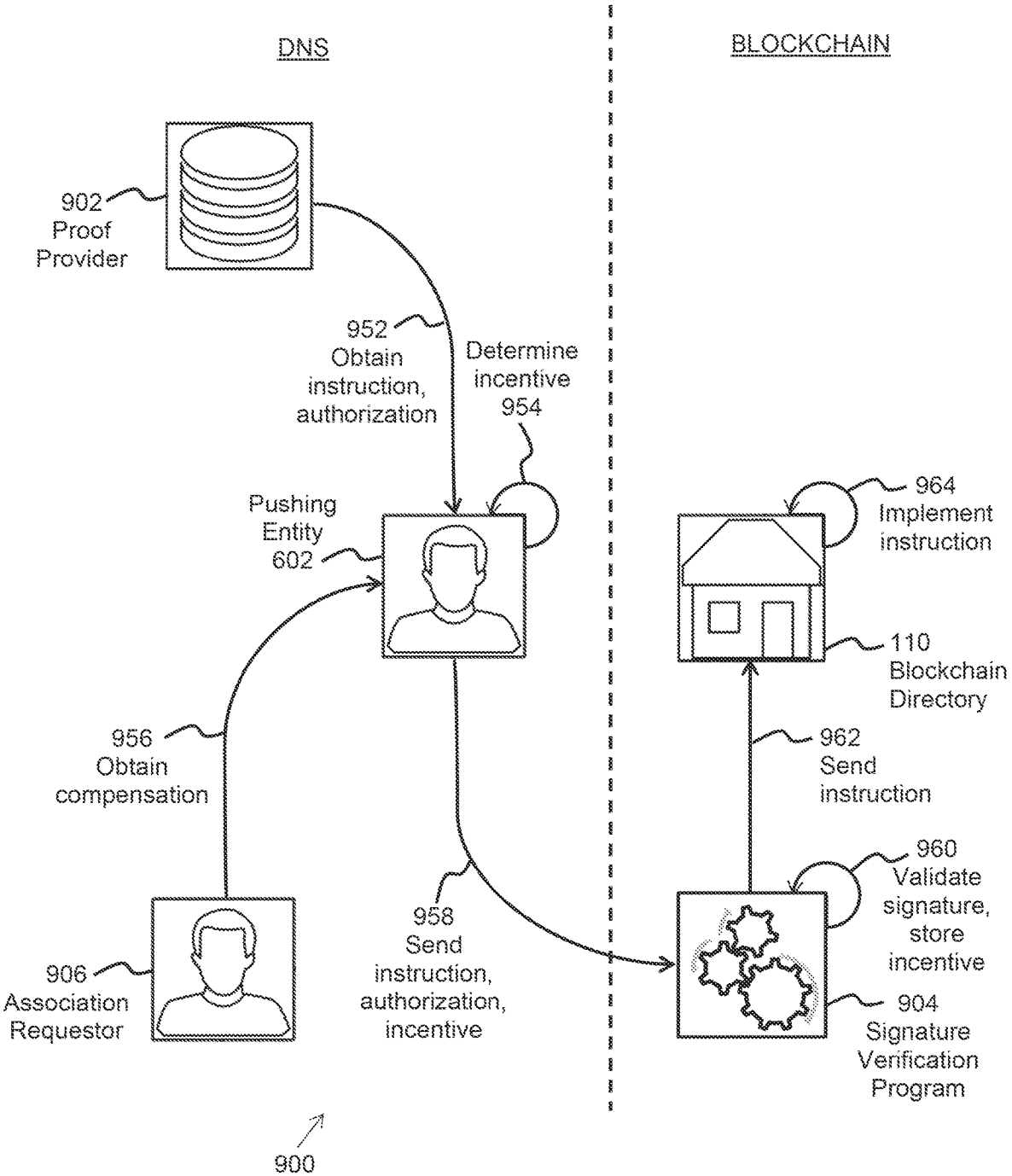
FIG. 9 is a hybrid diagram of a method for providing an incentive to update an association of a domain name with a blockchain address according to various embodiments.

FIG. 9 is a hybrid diagram of a method 900 for providing an incentive to update an association of a domain name with a blockchain address according to various embodiments. Method 900 may be employed at the time that the association is stored in the blockchain. For example, method 900 can be implemented as part of any of methods 200, 300, 400, 500, 600 (e.g., for create, update, transfer, or renew), and 700 (e.g., for create, update, transfer, or renew) as disclosed herein. Method 900 is therefore described in reference to pushing entity 602, which may be any of registry 102, registrar 104, registrant 202, any trusted service provider, or any other entity. Further, method 900 is described in reference to blockchain directory 110. Yet further, method 900 is described in reference to association requestor 906, which may be any entity that requests or initiates storing an association of a blockchain address with a domain name, e.g., registrant 202. Method 900 is further described in reference to proof provider 902, described presently.

Method 900 may begin with pushing entity 602 obtaining 952, from proof provider 902, an instruction to establish an association of a blockchain address with a domain name, together with an authorization to implement the association in the blockchain. Proof provider 902 can be any of a variety of entities, and the authorization can be any of a variety of authorizations. In general, proof provider 902 may be an authoritative source of information in the blockchain environment, and the authorization can be a representation of the association that is signed by proof provider 902. Specific examples of proof provider 902 and their authorizations follow.

According to some embodiments, proof provider 902 includes a registry, such as registry 102. According to such embodiments, the authorization can include a registrar of record proof, signed by registry 102, as disclosed in detail herein. According to such embodiments, method 900 may commence, for example, after a registrant, such as registrant 202, interacts with registrar 104 to request an association be implemented, as described in detail herein in reference to methods 200, 300, 400, 500, 600, and 700. According to such methods, registrar 104 communicates with registry 102 to request a registrar of record proof.

According to some embodiments, proof provider 902 includes any domain name infrastructure operator, such as a registration data access provider, for example a modified Registration Data Access Protocol (RDAP) provider, that provides registration status data, and the authorization may include a registration data record, such as a modified RDAP record, as disclosed presently. By way of non-limiting example, such embodiments are described presently in reference to a modification of RDAP and a modified RDAP provider, however, embodiments are not so limited, and may use any domain name infrastructure operator that provides registration status data. Continuing the description of an RDAP implementation, RDAP may be extended to store associations of domain names with blockchain addresses at the DNS registry, e.g., registry 102. Subsequently, any entity can obtain a RDAP record signed by the registry from the RDAP provider. Further, using such an extended RDAP record, any entity can push an association of a blockchain address with a domain name into the blockchain environment, where the registry's signature is verified by a signature verification program, e.g., signature verification program 106, before the association is stored in the blockchain. This verification may ensure that only registry-approved associations can be added to the blockchain. Thus, such embodiments may replace the registrar of record proof in methods 200, 300, 400, 500, 600, and 700 with an RDAP record that is signed by the registry.

According to some embodiments, proof provider 902 includes a modified WHOIS provider and the authorization includes a signed modified WHOIS record. Such embodiments present another type of any domain name infrastructure operator that provides registration data suitable for use in embodiments as described herein. According to such embodiments, WHOIS is modified to store and provide modified WHOIS records that include associations of blockchain addresses with domain names. Further, the WHOIS provider may be extended to obtain registry signatures on the WHOIS records that they provide. Thus, using such an extended WHOIS record, any entity can push an association of a blockchain address with a domain name into the blockchain environment, where the registry's signature is verified by, e.g., signature verification program 106, before the association is stored in the blockchain. This verification may ensure that only registry-approved associations can be added to the blockchain. Thus, such embodiments may replace the registrar of record proof in methods 200, 300, 400, 500, 600, and 700 with a modified WHOIS record that is signed by the registry.

According to an embodiment, like a registrar of record proof, a modified RDAP and WHOIS record may have an expiration. Such an expiration may be in the form of a time and date after which the records are not considered valid, an issuing time and date, or a sequence number. The expiration information may be signed.

However proof provider 902 and its authorizations are implemented, method 900 proceeds with pushing entity 602 obtaining 952 the authorization and an instruction from proof provider 902. The instruction may be any instruction to establish or modify an association of a domain name with a blockchain address. For example, the instruction may be an instruction to create such an association, update an association (e.g., add or change an association), transfer an association, or renew an association. For purposes of illustration rather than limitation, the present description proceeds with the instruction indicating that an association is to be created, e.g., as disclosed herein in reference to methods 200, 300, 400, 500, 600 (e.g., for create), and 700 (e.g., for create). Thus, the instruction may include a blockchain address and a domain name that are to be associated. Proof provider may provide the authorization and instruction to pushing entity using any communication channel and any protocol. According to embodiments in which both proof provider 902 and pushing entity 602 are a registry such as registry 102, the obtaining 952 may be performed internally or omitted.

Next, according to method 900, pushing entity 602 determines 954 an incentive, e.g., an amount of cryptocurrency, to be stored in the blockchain as a reward for updating the association. Pushing entity 602 may determine the incentive in any of a variety of ways.

According to some embodiments, pushing entity polls signature verification program 904, which may be a version of signature verification program 106 that has been modified to provide indications of incentive amounts. In such embodiments, signature verification program stores a datum representing an incentive amount and may respond to queries as to the value of the datum. The datum may be inserted by an operator or provider of signature verification program 904 according to various embodiments. Such an operator or provider may test many different scenarios so that they are comfortable with the level of fee to set that will still ensure that stale records are appropriately pruned. Additionally, signature verification program 904 may expose a mechanism to change the stored incentive representation. This may permit the operator or provider to handle potential changes to the underlying blockchain transaction fee structure.

According to some embodiments, pushing entity 602 determines the incentive in other ways, e.g., by consulting an internally stored representation. Regardless of how pushing entity determines 954 the incentive, it may include any fee for blockchain transactions, and may or may not include an additional amount that provides a profit to any entity that cleans a stale record and redeems the incentive, as shown and described herein in reference to FIG. 10.

The incentive itself may be any of a variety of amounts and in any of a variety of forms. According to some embodiments, the incentive may be tiered, e.g., the incentive may be dependent on the mechanism used to store the association. For example, different types of authorization may correspond to different incentive amounts. According to some embodiments, the incentive may be stabilized. For example, the incentive may be in terms of a stable coin for the cryptocurrency of the blockchain, such that the bounty is always, e.g., $0.01 USDT (USO Tethered stabled coin) instead of varying with respect to the underlying blockchain cryptocurrency. This may help avoid potential scenarios where a blockchain asset has increased in value, which would make the initial bounty more desirable beyond the original incentivized intention. According to some embodiments, the incentive may be a percentage or ratio of a fee charged, e.g., instead of a constant value. For such embodiments, the signature verification program may be encoded to compute such a percentage or ratio.

Further, according to method 900, pushing entity 602 obtains 956 compensation for the incentive from association requestor 906, e.g., registrant 202. Such compensation may be obtained in any of a variety of ways. According to some embodiments, association requestor 906 provides credit card information to pushing entity 602 via a user interface provided by pushing entity 602. According to some embodiments, where pushing entity 602 includes registrar 104, such a user interface may be part of the user interface registrar 104 provides for its customers. According to an embodiment, pushing entity 602 may obtain 956 compensation at any time. According to some embodiments, association requestor 906 may have an ongoing financial relationship with pushing entity 602, such that pushing entity 602 maintains a retainer provided by association requestor 906 that it draws from to obtain the compensation. Other techniques for pushing entity 602 obtaining 956 the compensation are also possible.

Next, according to method 900, pushing entity 602 sends 958 to signature verification program 904 an instruction corresponding to the instruction previously obtained 952, the authorization, and the incentive. As described above, if the instruction is to create a new association, the instruction may include a blockchain address and domain name that are to be associated. The incentive may be in the form of a signed blockchain transaction, for example. More particularly, pushing entity 602 may sign, using a private key of its blockchain key pair, a transaction conveying cryptocurrency in the amount of the incentive to signature verification program 904, e.g., using the blockchain address of signature verification program 904. These data may be sent using any appropriate communication channel and protocol.

Next, according to method 900, signature verification program 904 validates 960 the signature on the authorization. If the signature is invalid, then method 900 may halt, with signature verification program 904 returning an error message to pushing entity 602 and pushing entity 602 returning a corresponding error message to association requestor 906. Otherwise, if the signature is valid, signature verification program 904 may proceed to store the incentive. According to some embodiments, the incentive may be stored by a smart contract that implements or is associated with signature verification program 904. According to some embodiments, the incentive, or a representation thereof, is stored in blockchain directory 110. Regardless of its storage location, the incentive may be stored in association with the domain name provided in the instruction. According to some embodiments, the incentive is stored in a pool of like incentives for all or a portion of the domain names that it handles. According to an embodiment, signature verification program 904 may store the incentive using a smart contract in a manner that automatically conveys the incentive to an entity that later cleans the association if it becomes stale, as described in detail below in reference to FIG. 10.

Next, signature verification program 904 sends 962 the instruction to blockchain directory 110. This action may be implemented as described herein in reference to requesting 220 association or sending 664 the instruction. Subsequently, blockchain directory 110 implements 964 the instruction, e.g., by storing the association, e.g., as in the case of a create instruction.

Method 900 may then end.

Figure 10:
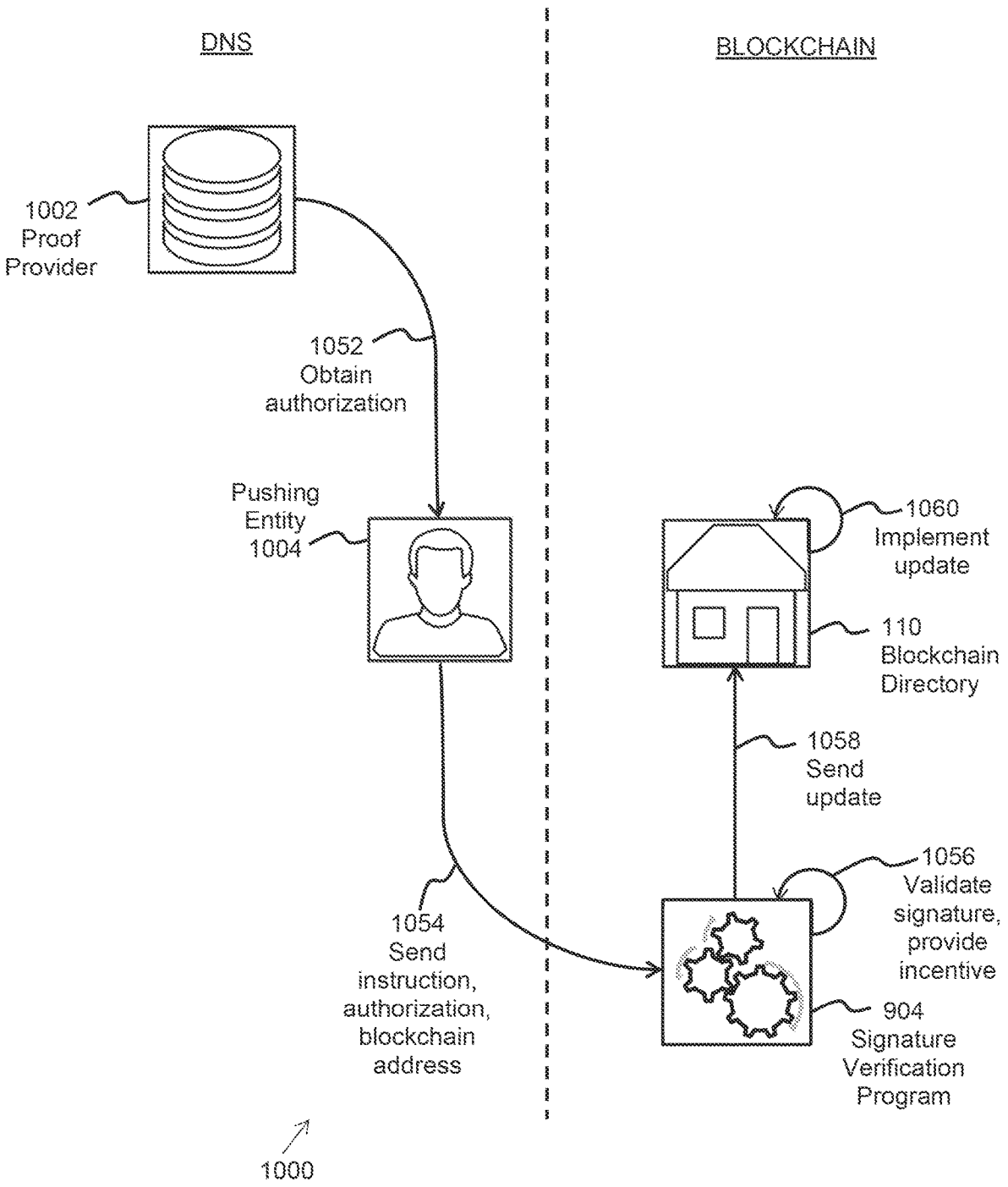
FIG. 10 is a hybrid diagram of a method for redeeming an incentive to update an association of a domain name with a blockchain address according to various embodiments.

FIG. 10 is a hybrid diagram of a method 1000 for redeeming an incentive to update an association of a domain name with a blockchain address according to various embodiments. Method 1000 may be employed as part of updating (e.g., removing) such an association stored in the blockchain. In particular, method 1000 may be employed as part of updating an association in the blockchain environment in order to be consistent with a change that has occurred in the DNS environment, e.g., when registration of the domain name has expired, been deleted, been transferred, of otherwise been updated. Thus, method 1000 may be implemented in conjunction with any of methods 200, 300, 400, 500, 600 (e.g., for update, delete, transfer, or expire), and 700 (e.g., for create, update, transfer, or renew) as disclosed herein. Method 1000 is therefore described in reference to pushing entity 1004, which may be any of registry 102, registrar 104, registrant 202, any trusted service provider, or any other entity. For example, pushing entity 1004 may be a third party, unrelated to registry 102, registrar 104, or registrant 202. Pushing entity 1004 is described further below. Method 1000 is also described in reference to blockchain directory 110, which is described in detail above in reference to FIG. 1, for example. Further, method 1000 is also described in reference to signature verification program 904, which is shown and described in detail above in reference to FIG. 9. Yet further, method 1000 is described in reference to proof provider 1002, also described in detail further below.

Pushing entity 1004 may learn about an opportunity to claim an incentive by updating a stale association in any of a variety of ways. For example, the registrar may notify a registrant when one of their domains has expired that they may reclaim any incentive that they previously paid, e.g., as association requestor 906 of method 900. According to such an example, pushing entity 1004 may include such a registrant. As another example, a DNS registration of a domain name may be transferred from a losing registrant to a gaining registrant. In this example, the losing registrar (which may be the same as the gaining registrar, e.g., if the new registrant keeps the same registrar) or the respective registry for the domain name may notify the gaining registrar and/or gaining registrant about the incentive that they can claim if they update the association in the blockchain environment. If the gaining registrar is notified, it may pass the notification to the gaining registrant. As yet another example, dropped domain names (e.g., expired or deleted domain names) may have an incentive attached to them, so the losing registrar or the registry for the domain name may notify any new gaining registrant and/or registrar that they may claim the incentive. As in the previous example, if the gaining registrar is notified, it may pass the notification on to the gaining registrant.

As yet another example, the registry for the domain name may notify any gaining or losing registrar or registrant when a status of the domain name has changed in the DNS environment that may affect its association(s) with blockchain addresses in the blockchain environment. In general, the registry may maintain its own record of any or all incentives that are stored in the blockchain for any or all domain names in its purview. The registry may consult such a record whenever a registration status of any domain name in the DNS changes and, if an incentive is attached, notify any interested party, e.g., gaining or losing registrars or registrants. To notify a registrar, the registry may place a message in an EPP poll to registrar queue. According to an embodiment, the registry may publish in a public location, such as a webpage, a list of expired or registration-status-changed domain names that have attached incentives. According to some embodiments, the registry itself may perform the update, e.g., the registry may be pushing entity 1004 and claim the incentive. In any of the examples provided herein, the notification may occur via a text message or user interface provided by a registry, registrar, or other DNS operator, for example.

According to various embodiments, pushing entity 1004 seeks out indications of changes to domain name registration statuses in the DNS environment that have incentives attached in the blockchain environment. For example, any third party, not necessarily a registrant, registrar, or registry, may consult any list of domain names with attached incentives that have expired or otherwise had their registration statuses changed, e.g., a list published by the registry. According to an embodiment, such a third party (or any other entity) may discover opportunities to claim incentives by scraping registration data, RDAP records, and/or WHOIS records that have been modified as described above in reference to FIG. 9 to include blockchain address association information. Alternately, or in addition, such a third party (or other entity) may scrape NSEC or NSCE3 records, as described below, in order to obtain such information. Examples of how changes to domain name status information that may lead to opportunities to redeem incentives are not limited to those explicitly set forth herein.

According to some embodiments, a time period is provided in which certain entities are given the right of first refusal to claim an incentive. For example, according to some embodiments, before allowing anyone to claim an incentive, some predetermined length of time (e.g., 6 hours, a day, two days, three days, a week, a month) is set within which the original incentive submitter, e.g., association requestor 906 of FIG. 9, or some other pre-determined entity or entities may submit an update to claim the incentive. This provides some degree of fairness to the system by letting the original party in particular, or another predetermined entity, claim the incentive. For example, according to some embodiments, a registry, registrar, registrant, reseller, secondary market, or other DNS ecosystem user may be provided with a first pass at claiming the incentive. For example, signature verification program 106 may maintain a list of entities for which the right of first refusal is available.

Some embodiments may use a proxy for time, such as a number of blocks in the blockchain. Techniques that utilize a smart contract to provide a time period for a right of first refusal are described further below.

After pushing entity 1004 learns of an opportunity to claim an incentive, and pushing entity 1004 is authorized to claim the incentive at the current time for embodiments that include a right of first refusal period, method 1000 may begin with pushing entity 1004 obtaining 1052, from proof provider 1002, an authorization to implement an update of an association of a blockchain address with a domain name in the blockchain. Proof provider 1002 can be any of a variety of entities, and the authorization can be any of a variety of authorizations. In general, proof provider 1002 may be an authoritative source of information in the DNS environment, and the authorization can be a representation of the update that is signed by a private key of an asymmetric cryptographic key pair of proof provider 1002. Specific examples of proof provider 1002 and their authorizations follow.

According to various embodiments, proof provider 1002 may be any of the entities described above in reference to proof provider 902 of FIG. 9. Thus, according to various embodiments, proof provider 1002 may be a registry, and the authorization may be a registrar of record proof, e.g., as disclosed herein in reference to FIGS. 1-9. According to various embodiments, proof provider 1002 may be a domain name infrastructure operator, and the authorization may include a signed representation of registration status data. Examples of such domain name infrastructure operators e.g., modified RDAP or WHOIS providers, and their respective authorizations, e.g., modified RDAP or modified WHOIS records, are presented above in reference to FIG. 9.

Another example of a suitable proof provider 1002 that is a domain name infrastructure operator that provides registration status data is an entity that provides authenticated denials of existence of registrations of domain names, e.g., an entity that provides signed messages indicating that a given domain name is not registered. An example of such an entity is an NSEC or NSEC3 operator. A DNS operator for a given record can use DNSSEC to impart such information, for example. The NSEC or NSEC3 operator may provide signed records of nonexistence (e.g., non-registration) of domain names. Such records may be verified using a public key of an asymmetric key pair found in a DNSKEY record in the DNSSEC infrastructure. Such records may be used as the authorization obtained 1052 by pushing entity 1004. According to an embodiment, similar to the other forms of authorization, the NSEC and NSEC3 records may have an expiration.

After pushing entity 1004 obtains 1052 the authorization, method 1000 continues by pushing entity sending 1054 an instruction, the authorization, and its blockchain address to signature verification program 904. The instruction may represent the update to the association of the domain name with the blockchain address. Thus, the instruction can include the domain name and the blockchain address. The instruction may indicate that the association is to be removed (e.g., a single association of the domain name with a blockchain address removed), deleted (e.g., all associations for the domain name with any blockchain address removed), or transferred, by way of non-limiting examples. The blockchain address of pushing entity 1004 is included so that the cryptocurrency incentive can be conveyed to pushing entity 1004 by signature verification program 904 as described in detail below. Pushing entity 1004 may send the authorization, instruction, and blockchain address to signature verification program 904 using any available communication channel and protocol.

Next, signature verification program 904 validates 1056 the signature on the authorization. If invalid, method 1000 may halt, with signature verification program returning an error message to pushing entity 1004. Otherwise, method 1000 may proceed with signature verification program 904 providing the incentive to pushing entity 1004, using the provided blockchain address of pushing entity 1004 as the destination for the incentive cryptocurrency.

Signature verification program 904 may provide the incentive to pushing entity in a variety of ways. According to some embodiments, signature verification program 904 is or includes a smart contract. Such a smart contract may specify that its state changes upon satisfaction of certain conditions, which changes the state of the blockchain to reflect that the incentive has been transferred to pushing entity 904. Such conditions can include that an authorization has been validated and that an instruction representing updating the association has been received and/or implemented. Pseudocode for an example smart contract is provided in Table 1 below.

TABLE 1

| Example Pseudocode |
| --- |

```
contract BountyRegistry {
    mapping (bytes32 => address) domainOwner;
    // cover 350,000 cryptocurrency subunits in clean-up costs, a bit more than the
expected 300k cryptocurrency subunits
    uint bountyFee = 0.00035;
    mapping (bytes32 => uint) bountyStorage;
    // costs: 500,000 cryptocurrency subunits to execute successfully + 350,000
bounty fee == 0.00085 cryptocurrency units
    function submitProof(bytes32 domain, address owner, bytes proof) payable {
        require(msg.value >= bountyFee);
        bountryStorage[domain] = msg.value;
        // proof verification not shown....
        domainOwner[domain] = owner;
    }
    // costs: 300,000 cryptocurrency subunits to execute successfully, but bounty
fee is 350,000 cryptocurrency subunits.
    // Party that cleans up the record should receive about ~50,000 cryptocurrency
subunits as a reward
    // which is equal to ~0.00005 cryptocurrency units
    function removeOwner(bytes32 domain, bytes proof) {
        // proof verification not shown....
```

TABLE 1-continued

Example Pseudocode

```
    domainOwner[domain] = 0x0;
    // send the bounty fee and set the remaining fee to 0
    msg.sender.transfer(bountyStorage[domain]);
    bountyStorage[domain] = 0;
  }
}
```

The pseudocode in Table 1 may be used to convey an incentive. In the example pseudocode, each cryptocurrency unit is considered to include 1,000,000,000 subunits. The pseudocode in Table 1 includes a removeOwner function that accepts a domain name and a proof as inputs and operates to remove any associations of blockchain addresses with the specified domain name. Any entity can submit the proof used by the removeOwner function to both clean up the stale association in the blockchain and claim the incentive.

To add support for a right of first refusal time period, the logic in the removeOwner function may be altered. For example, the smart contract may store a map (or several variables) of identifiers (e.g., blockchain addresses) of entities who are authorized to have a first pass at claiming the incentive. Further, the removeOwner function may reference such a map and also include logic to view the timestamp in the proof to determine if and when the expiration occurred. If pushing entity 602 is not among entities that are provided an early right of first approval, and the proof used by the removeOwner function is submitted before the end of the first refusal time period elapses, then method 1000 may halt with an error message. After that time period has elapsed, it may default to allowing anyone to claim the bounty.

Further, according to method 1000, signature verification program may proceed to send 1058 an update for the association to blockchain directory 110. Blockchain directory 110 may proceed to 1060 implement the update.

This may conclude method 1000.

Figure 11:
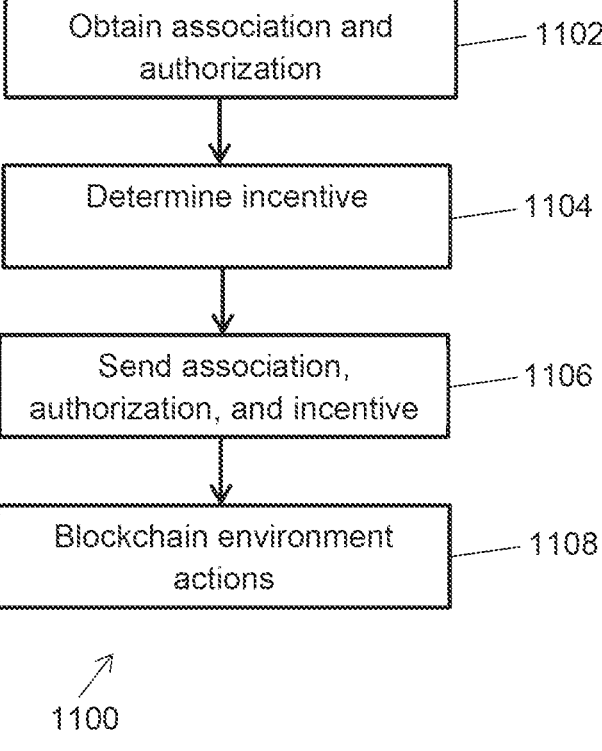
FIG. 11 is a flow diagram for a method of providing an incentive to update an association of a domain name with a blockchain address according to various embodiments.

FIG. 11 is a flow diagram for a method 1100 of providing an incentive to update an association of a domain name with a blockchain address according to various embodiments. Method 1100 may include one or more actions as shown and described above in reference to FIG. 9. Initial actions of method 1100, e.g., 1102, 1104, and 1106, may be carried out by any pushing entity, such as pushing entity 602, as shown and described above in reference to FIG. 9, and further actions, e.g., 1108, may be carried out in the blockchain environment, e.g., by a smart contract such as smart contract 904 as shown and described in reference to FIG. 9.

At 1102, method 1100 may begin with an entity, such as pushing entity 602, obtaining an association of a network identifier with a blockchain address and an authorization to push the association of the network identifier with the blockchain address to a blockchain. The actions of 1102 may include some or all of the actions of obtaining 952 as shown and described above in reference to FIG. 9. For example, the association may be in the form of a domain name and an associated blockchain address, e.g., as established using any of methods 200, 300, 400, 500, 600 (e.g., for create, update, or transfer), or 700 (e.g., for create, update, or transfer). The authorization may include, for example, a signature formed using a private key of an asymmetric cryptographic key pair of a trusted entity such as a registry. The authorization may include, for example, a registrar of record proof, a modified RDAP record or a modified WHOIS record, as described herein in reference to FIG. 9.

Next, at 1104, method 11000 may include determining an incentive to update the association of the network identifier with the blockchain address at the blockchain. The actions of 1104 may include some or all of the actions of determining 954 as shown and described above in reference to FIG. 9. The determination may include, for example, obtaining information from the blockchain, e.g., from a smart contract such as smart contract 904 as shown and described herein in reference to FIGS. 9 and 10. The incentive may include a specified quantity of cryptocurrency.

Next, at 1106, method 1100 may include sending, to the blockchain, the association of the network identifier with the blockchain address, the authorization to push the association of the network identifier with the blockchain address to the blockchain, and the incentive. The actions of 1106 may include some or all of the actions of sending 958 as shown and described above in reference to FIG. 9.

Next, at 1108, blockchain actions are performed. The actions of 1108 may include some or all of the actions of validating 960, sending 962, and implementing 964, as shown and described above in reference to FIG. 9. For example, the blockchain may verify the authorization to push the association of the network identifier with the blockchain address to the blockchain, store the association of the network identifier with the blockchain address, and store the incentive for future payment to an entity that updates the association of the network identifier with the blockchain address.

This may conclude method 1100.

C. Variations, Modifications, Alternate Embodiments, and Example Use Cases

Embodiments of systems for and methods of providing and redeeming incentives to update associations of network with a blockchain addresses are not limited to domain names as network identifiers for blockchains. In general, embodiments may be implemented in any environment where public key infrastructure is used. For example, embodiments may be used in public key infrastructure in Digital Object Architecture (DOA) with signed assertions, such that whenever an assertion expires or is invalidated, someone is incentivized to submit the update. As another example, domain certificates could be used to establish domain registration based on the certificate, with an Online Certificate Status Protocol (OCSP) or other revocation tool being used to remove revoked certificates. As yet another example, embodiments may be used to maintain and clean linkages between domain names and a social network identifier, e.g., signed by the social network or the registry/registrar/DNS provider/etc. As yet another example, embodiments may be used to clean stale attestations of any type. For example, an OpenID party may attest to the value of a certain attribute.

If that value changes and a valid proof of change is submitted, the stale data could be removed using an embodiment.

As another example, note that the incentive storage and redemption system can itself be used to keep itself updated, e.g., to update potentially out of sync incentive prices. Such embodiments may utilize an exposed mechanism in the smart contract to update the prices.

A particular use case for embodiments of this section includes blockchain miners (or validators) redeeming incentives as the blocks that include the association updates are mined. Such miners or validators may monitor smart contracts (e.g., a smart contract of signature verification program 904) in real time and make claims to incentives in such a way that beats all possible parties to claiming the incentives. For example, a miner could include a transaction in block N of the blockchain that results in a stale association, recognize this stale association, and then create its own transaction in the same block N to claim the stale association's incentive. In this way the miner would gain an extra profit on the block they generate with little or no risk to themselves.

Some embodiments may reuse stored incentives. For example, if an incentive is already linked to a stale association and has not been claimed, it may be reused for any association that represents an update to the stale association. For example, if a user updates an association such that their domain name is associated with a new blockchain address, then the submitted update could use the original incentive and not incur the financial charge of adding a second incentive. Such reuse of an existing incentive helps to emphasize that the incentives are not taxes on every update, but only particular operations where incentives to clean stale data become misaligned.

VII. Example System

Figure 12:
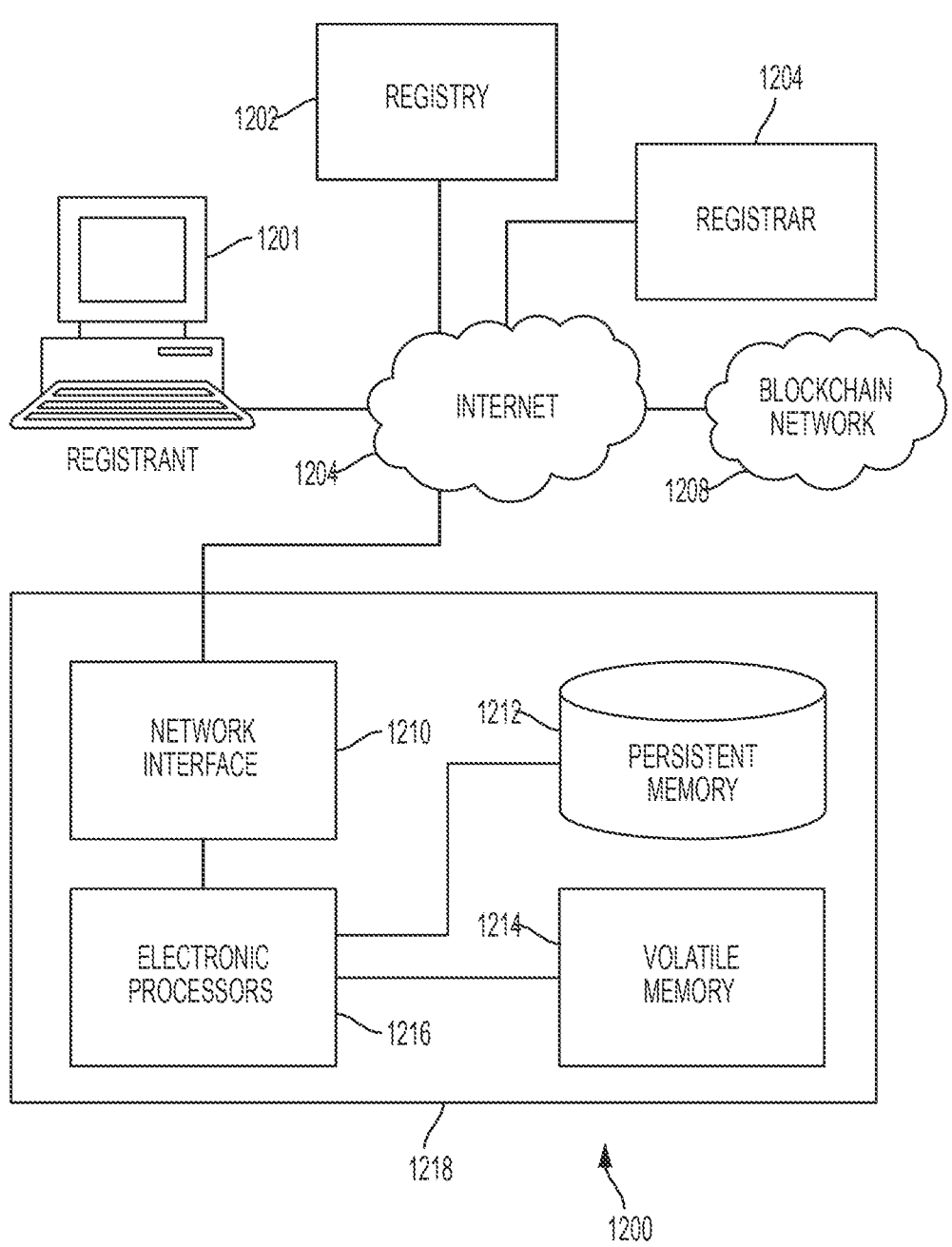
FIG. 12 is a schematic diagram of a server computer according to various embodiments.

FIG. 12 is a schematic diagram of a system 1200 including server computer 1218 according to various embodiments. System 1200 includes, for example, registrant 202 (identified with their computer), DNS registry 1202, DNS registrar 1204, and server computer 1218, all communicatively coupled to the internet 1204. System 1200 may also include blockchain 1208, which itself may include a plurality of networked nodes, which themselves may be networked through the internet 1204. Server computer 1218 may be, for example, a server computer of registry 102, registrar 104, or trusted service provider 502, according to various embodiments. Registry 1202 may be registry 102, and/or registrar 1204 may be registrar 104, consistent with server computer 1218 being either registry 102 or registrar 104, according to various embodiments. FIG. 12 is intended to display the various components networked together, as well as the internal workings of a server computer consistent with the various, e.g., registry and registrar, servers disclosed herein.

Server computer 1218 may include network interface 1210 to communicatively couple to the internet 1204. Network interface 1210 may include a physical network interface, such as a network adapter. Server computer 1218 may be a special-purpose computer, adapted for reliability and high-bandwidth communications. Thus, server computer 1218 may be embodied in a cluster of individual hardware server computers, for example. Alternately, or in addition, server computer 1218 may include redundant power supplies. Persistent memory 1212 may be in a Redundant Array of Inexpensive Disk drives (RAID) configuration for added reliability, and volatile memory 1214 may be or include Error-Correcting Code (ECG) memory hardware devices. Server computer 1218 further includes one or more electronic processors 1216, which may be multi-core processors suitable for handling large amounts of information. Electronic processors 1216 are communicatively coupled to persistent memory 1212, and may execute instructions stored thereon to at least partially effectuate the techniques, functions, and operations disclosed herein, e.g., any of the methods shown and described herein in reference to FIGS. 1-11, and any variation, modification, or alternate methods as described herein. Electronic processors 1216 are also communicatively coupled to volatile memory 1214.

VIII. Establishing an Association: Variations, Modifications, and Alternate Embodiments Many variations on the disclosed embodiments are possible. Some example variations and modifications are presented below.

A. Lower Level Domain Names

Some embodiments permit associating second-level (and third or lower level) domain names with blockchain addresses in a blockchain. In this context, for example, the highest level of the domain may be the top level domain or TLD, and the lower level domains are based on the hierarchy of the domain name. For example, an entity may have registered the domain name example.com, where ".com" is the highest or top level domain and "example" is the lower or second level domain. As such, the entity has also registered any domain names that include second or lower level domain names under the domain name example.com. Thus, the same entity may have registered first.example.com, big.example.com, purple.example.com, subdomain(s) of "example.com," etc. Such an entity may use method 100 and any of methods 200, 300, 400, or 500, in the stead of registrant 202, to associate domain names that include second or lower level domain names under example.com with blockchain addresses for anyone, not limited to the entity themselves. Thus, the entity that has registered example.com may have a web-based business that provides blockchain name associations to its customers. The entity, rather than its customers, may receive a customer's existing blockchain address and proceed to use any of methods 200, 300, 400, or 500 to associate a domain name that includes a second or lower level domain name under example.com to the customer. Either the entity or the customer may choose the second level (and/or lower) domain name. According to an embodiment, because the entity has registered example-.com, the entity can ensure that the registrar of record proof procedure described herein is accomplished in order to associate such subdomain names.

According to various embodiments, the extended Delete command described herein may or may not remove associations of subdomains with blockchain addresses.

B. Registrant Confirmation Via Wallet

Some embodiments await confirmation from the registrant prior to finalizing the association of a domain name with a blockchain address. Any of the disclosed embodiments may implement this variation. For purposes of description rather than limitation, an example embodiment is described relative to method 400 of FIG. 4, with the differences disclosed and explained presently. In such embodiments, the step of registrant 202 signing 204 their existing address using their blockchain private key to create a proof of blockchain address ownership may be omitted. After signature verification program 106 receives the domain name, proof, and existing blockchain address sent 414 from registry 102, and after signature verification program 106 verifies 218 the signature on the proof, it stores a holding record in the blockchain. For example, the holding record may include, or include references to, the domain name at issue and the registrant's existing blockchain address. In such embodiments, signature verification program 106 awaits confirmation to associate the domain name from registrant 202 before proceeding to request 220 association from blockchain directory 110. Registrant 202 may provide such confirmation through the registrant's wallet.

In more detail, the electronic wallet may include functionality that detects whether registrant 202 confirmation is required and permits registrant 202 to send such a confirmation to signature verification program 106. To detect the registrant 202 confirmation requirement, the wallet may interact with the blockchain, and/or with signature verification program 106 to retrieve any pending holding records relevant to registrant 202. The wallet may use the detection of any retrieved holding records that match the existing blockchain address, or registered domain name, of registrant 202, as an initiation to prompt registrant 202 for confirmation. For example, the wallet may display a virtual button labeled using information from the holding record, e.g., "Claim domain name example.com as your blockchain address instead of 0x987 . . . ?", where the actual blockchain address may be presented. Upon registrant 202 providing confirmation via their wallet to signature verification program 106, it proceeds to request 220 association of the domain name with the blockchain address of registrant 202.

Embodiments that utilize registrant confirmation may thwart or prevent registrant 202 from associating their domain name with a blockchain address for another blockchain user.

C. Registrant Confirmation Via Voiceprint

According to some embodiments, registry 102 and/or registrar 104 may store voiceprints of some or all contacts attached to a domain name. In general, domain name registration may involve providing, for example, the registrant's contact information to the registrar of record, which passes it to the respective registry. In some embodiments, the registration process may include the step of some (or all) contacts for the domain name providing voiceprints to the registrar. Such a voice print may be of a contact, such as registrar 202, saying the domain name itself. Registrar 104 may store and pass the received voiceprint(s) to registry 102 for storage. Registry 102 may set up and implement a new EPP extension for the purpose of accepting and storing voiceprints via its EPP interface.

Embodiments may utilize the stored voiceprints as follows. Registrar 104 may provide non-transitory computer executable code to manufacturers, supporting companies, or distributers of consumer voice-based computers that facilitates registrant 202 requesting 206 association of a domain name for a blockchain address audibly. The code may be installed on such voice-based computers and, when executed, configure such computers to receive and process audible requests to request 206 association. An example, non-limiting format for such requests is, "computer, associate my domain name example.com in blockchain X with blockchain address 0x987 . . . ". When a properly configured consumer voice-based computer receives such an audio command, it may proceed to form and send a request to registrar 104 as disclosed above in reference to methods 200, 300, 400, and 500. However, the request may further include, or be preceded or followed by, a request that includes the voiceprint of registrant 202, e.g., the portion of the voiceprint representing the audible domain name itself. Registrar 104 may receive the request and process it as disclosed in reference to methods 200, 300, 400, and 500, after it has successfully verified a match between the received voiceprint and a stored voiceprint. The matching process, for example, may be a probabilistic matching process that outputs a probability of a match, and the method may proceed if the output probability exceeds a predetermined or preset threshold, e.g., at least a 95% probability of a match.

According to some embodiments, instead of registrar 104 detecting a voiceprint match, registrar 104 instead passes the received voiceprint to registry 102, which performs the verification of the match between the received voiceprint and a stored voiceprint, and provides the results back to registrar 104. In such embodiments, the remainder of the steps are similar or essentially identical to those of methods 200, 300, 400, and 500 after registry 102 has verified the voiceprint match.

D. Other Identifiers as Blockchain Addresses

Some embodiments associate an identifier other than a domain name with a blockchain address in a blockchain. Examples of such identifiers include, but are not limited to, telephone numbers and email addresses. Such embodiments differ from the embodiments disclosed herein in Sections II and III as follows. The identifier holder, e.g., the telephone number owner or email address user, takes the place of registrant 202. The entity that provides the identifier, e.g., a phone company for a telephone number or an email provider for an email identifier, takes the place of registry 102. A facilitating company may take the place of registrar 104. The facilitating company may have or may establish a communication channel with the entity that provides the identifier, e.g., the entity that provides the identifier has an internet-based interface or API.

For the setup phase of such embodiments, method 100 proceeds as disclosed above in Section II, except that the entity that provides the identifier performs the actions of registry 102, and the facilitating company performs the actions of registrar 104. Instead of registry 102 adding support for a registrar of record proof EPP extension, the entity that provides the identifier provides support for responding to requests 208 for proof sent by the facilitating company. The requests may be sent through the communication channel between the entity that provides the identifier and the facilitating company. In such embodiments, the entity that provides the identifier obtains and utilizes a proof key pair as disclosed above in Section 111. The signature verification program 106 may be configured to verify the signatures by the entity that provides the identifier, rather than signatures by registry 102. The signatures may be on data that specifies an identifier such as a phone number or email address and an existing blockchain address, instead of on data that specifies a domain name and an existing blockchain address.

For the execution phase of such embodiments, the entity that provides the identifier performs the actions of registry 102, and the facilitating company performs the actions of registrar 104. Any of methods 200, 300, 400, or 500 may be altered as described presently. The identifier holder, instead of registrant 202, requests 206 association of their identifier with a blockchain address. The facilitating company receives the request and requests 208 proof from the entity that provides the identifier. The remaining flow is as described above in Section II for any of methods 200, 300, 400, or 500, mutatis mutandis.

According to some embodiments, the facilitating company may be merged with the entity that provides the identifier. In such embodiments, the entity that provides the identifier may establish an interface that performs the analogous actions of registrar 104. Further, the request 208 for proof may be performed by the same entity. Such embodiments perform as described herein, except that communications 208, 210, and 212 are performed by different portions of the same entity, rather than by different entities.

Embodiments disclosed in this subsection may have the added benefit of enabling secure two-factor identification by consulting the blockchain for a given user's address to fetch additional factors for use to verify its identity. For example, if a given address on a blockchain has an attached phone number or email address, those could be consulted on chain as a source to send a message to, to confirm proof of address ownership.

Further, embodiments disclosed in this subsection may be particularly beneficial to payment providers and their users. For example, a payment provider may be any entity that provides customer accounts to customers that permit such customers to send to and receive payment from other customers using customer identifiers instead of banking information. For example, a payment provider may enable its customers to send and receive money amongst themselves by specifying domain names and currency amounts. In particular, a first customer may log into a payment provider webpage interface by providing a domain name and password, then provide to the interface a domain name of a second customer, as well as a US dollar amount, along with instructions to pay, and the payment provider may respond to such instruction by moving currency between customer accounts as instructed. According to embodiments described in this subsection, a payment provider may associate an existing payment provider identifier (e.g., domain name) with a blockchain address. In this way, a payment provider customer may broadcast, publish, or otherwise make known a central payment identifier, e.g., their domain name, along with instructions that the customer may receive payment through such identifier either by way of the standard techniques of the payment provider, or via cryptocurrency using a cryptocurrency blockchain using the same identifier, e.g., domain name.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method comprising:

receiving, by an authoritative record entity, a request to transfer an association of a network identifier with a blockchain address on a blockchain, wherein the request comprises a transfer command; and transferring, in response to the receiving, the association of the network identifier with the blockchain address from a first entity of the blockchain to a second entity of the blockchain.

2. The method of claim 1, wherein:

an executable program stored on the blockchain is configured to receive the request, to verify a signature provided by the authoritative record entity, and to transfer the association of the network identifier with the blockchain address.

3. The method of claim 1, wherein:

the first entity comprises a first registrant and the second entity comprises a second registrant different from the first registrant.

4. The method of claim 1, further comprising:

determining a registration entity of record for the network identifier; and sending a message to the registration entity of record indicating that the first entity signed the request to transfer the association of the network identifier with the blockchain address on the blockchain to the second entity.

5. The method of claim 4, wherein the registration entity of record comprises a registrar, and the method further comprising:

causing the registrar to send a notification to the second entity.

6. The method of claim 1, wherein:

the network identifier comprises a domain name, and the authoritative record entity comprises a registry.

7. The method of claim 1, wherein:

the transfer command comprises an extended Extensible Provisioning Protocol (EPP) transfer command from a registrar.

8. The method of claim 1, further comprising:

preventing the first entity from associating the network identifier with the blockchain address after transferring the association of the network identifier with the blockchain address on the blockchain to the second entity.

9. The method of claim 1, further comprising:

querying the first entity or the second entity to determine whether to retain an existing blockchain address association, wherein transferring the association of the network identifier with the blockchain address is based at least in part on a query response from the first entity or the second entity.

10. The method of claim 1, wherein:

the request is received from a registration entity of record.

11. A system comprising:

a memory containing instructions; and a processor, operably connected to the memory, that executes the instructions to perform operations comprising:

receiving, by an authoritative record entity, a request to transfer an association of a network identifier with a blockchain address on a blockchain, wherein the request comprises a transfer command; and transferring, in response to the receiving, the association of the network identifier with the blockchain address from a first entity of the blockchain to a second entity of the blockchain.

12. The system of claim 11, wherein:

an executable program stored on the blockchain is configured to receive the request, to verify a signature provided by the authoritative record entity, and to transfer the association of the network identifier with the blockchain address.

13. The system of claim 11, wherein:

the first entity comprises a first registrant and the second entity comprises a second registrant different from the first registrant.

14. The system of claim 11, the operations further comprising:

determining a registration entity of record for the network identifier; and sending a message to the registration entity of record indicating that the first entity signed the request to transfer the association of the network identifier with the blockchain address on the blockchain to the second entity.

15. The system of claim 14, wherein:

the registration entity of record comprises a registrar.

16. The system of claim 11, wherein:

the network identifier comprises a domain name, and the authoritative record entity comprises a registry.

17. The system of claim 11, wherein:

the transfer command comprises an extended Extensible Provisioning Protocol (EPP) transfer command from a registrar.

18. The system of claim 11, the operations further comprising:

preventing the first entity from associating the network identifier with the blockchain address after transferring the association of the network identifier with the blockchain address on the blockchain to the second entity.

19. The system of claim 11, the operations further comprising:

querying the first entity or the second entity to determine whether to retain an existing blockchain address association, wherein transferring the association of the network identifier with the blockchain address is based at least in part on a query response from the first entity or the second entity.

20. The system of claim 11, wherein:

the request is received from a registration entity of record.

* * * * *